United States Patent [19]

Suzuki et al.

[11] Patent Number: 5,555,476
[45] Date of Patent: Sep. 10, 1996

[54] MICROLENS ARRAY SHEET FOR A LIQUID CRYSTAL DISPLAY, METHOD FOR ATTACHING THE SAME AND LIQUID CRYSTAL DISPLAY EQUIPPED WITH THE SAME

[75] Inventors: Motoyuki Suzuki, Kyoto; Tetsuo Uchida; Kazuo Matsuura, both of Otsu, all of Japan

[73] Assignee: Toray Industries, Inc., Japan

[21] Appl. No.: 295,249

[22] Filed: Aug. 24, 1994

[30] Foreign Application Priority Data

Aug. 30, 1993 [JP] Japan .................................. 5-235882
Sep. 2, 1993 [JP] Japan .................................. 5-243793
Sep. 2, 1993 [JP] Japan .................................. 5-243794

[51] Int. Cl.$^6$ ...................... G02F 1/1335; G02F 1/1333; G02F 1/13
[52] U.S. Cl. .................. 359/40; 359/94; 359/67
[58] Field of Search .................. 359/40, 41, 69, 359/67, 94

[56] References Cited

U.S. PATENT DOCUMENTS 5,151,801 9/1992 Hiroshima ................................ 359/40

FOREIGN PATENT DOCUMENTS

| 53-25399 | 3/1978 | Japan . | |
| 56-65175 | 6/1981 | Japan . | |
| 60-202464 | 10/1985 | Japan . | |
| 0241024 | 11/1985 | Japan | 359/40 |
| 61-148430 | 7/1986 | Japan . | |
| 2267723 | 11/1987 | Japan | 359/40 |
| 2-108093 | 4/1990 | Japan . | |
| 3-253819 | 11/1991 | Japan . | |
| 3267918 | 11/1991 | Japan | 359/41 |
| 5346578 | 12/1993 | Japan | 359/41 |
| 5346577 | 12/1993 | Japan | 359/41 |
| 2278222 | 11/1994 | United Kingdom | 359/40 |

*Primary Examiner*—William L. Sikes
*Assistant Examiner*—Tiep H. Nguyen
*Attorney, Agent, or Firm*—Austin R. Miller

[57] ABSTRACT

Disclosed is a microlens array sheet for a liquid crystal display including a first substance layer and a second substance layer having a refractive index less than that of the first substance layer. A plurality of minute unit lenses are formed by providing concaves and/or convexes to an interface between the first and second substance layers. When a ray having entered into the sheet from the normal-line direction of the second substance layer exits from the surface of the first substance layer, an refractive angle relative to the normal line of the surface of first substance layer is not less than 30 degrees. When this microlens array sheet is attached to the surface of a liquid crystal cell of a liquid crystal display, an improved large angle of visibility can be obtained.

23 Claims, 12 Drawing Sheets

VII

MICROLENS ARRAY SHEET FOR A LIQUID CRYSTAL DISPLAY, METHOD FOR ATTACHING THE SAME AND LIQUID CRYSTAL DISPLAY EQUIPPED WITH THE SAME

BACKGROUND OF THE INVENTION

1. Field of the Invention

The present invention relates to a microlens array sheet for a liquid crystal display, a method for attaching the same and a liquid crystal display equipped with the same.

2. Description of the Related Art

A microlens array sheet arranged with minute unit lenses such as convex lenses and concave lenses in plane is expected for applications to liquid crystal displays, optically coupled optical elements or image input apparatuses, and the research thereof has been developed.

The microlens array sheets are typically classified into two types. One of the types is a microlens array sheet made by forming and arranging controlled concave and convex units (minute unit lenses) on a base plate having a flat surface using a fine processing technology. The other is a microlens array sheet made by providing a distribution of refractive index to appropriate minute unit portions in a planar base plate, that is, so-called flat-plate microlens array sheet.

In liquid crystal displays, usually the display is performed by utilizing an electro-optical effect of liquid crystal molecules, that is, by using a liquid crystal cell arranged with optical shutters which change ray transmittance or reflectance by utilizing an optical anisotropy (anisotropy in refractive index), orientation, flowability and dielectric anisotropy of liquid crystal molecules, and applying an electric field or sending an electric current to appropriate display units. In the liquid crystal displays, there are a direct-sight type display in which an image displayed on a liquid crystal cell is directly observed, and a projection type display in which an image to be displayed is projected onto a screen from front side or back side and the projected image is observed.

The direct-sight type liquid crystal display (hereinafter, also referred to as merely "liquid crystal display" or "LCD") has a defect that the image quality changes depending upon direction of observation. Since generally it is set so that the best image quality can be obtained when observed from the normal direction of the display surface, the image quality deteriorates as the angle between the observation direction and the normal direction of the display surface becomes larger. If the angle becomes larger than a certain level of angle, the image quality is out of a range which an observer can accept. Namely, the liquid crystal display has a defect that the range of the angle of visibility which can obtain a good image quality (hereinafter, also referred to as merely "angle of visibility") is narrow.

The defect that the angle of visibility is narrow is particularly remarkable in a super twisted nematic mode, which is often applied to personal word processors or personal computers because of excellent properties thereof that the structure is simple, the productivity is excellent and a large capacity of display is possible, or in a twisted nematic mode displaying gray scales, which is used for, for example, television receivers. By this defect, when observed from a direction with an angle in the range of 10–50 degrees from the normal-line of the display surface (the angle is different depending on the case where the measuring direction for the angle is vertical direction or horizontal direction), the displayed image often cannot be recognized. Therefore, in practice, a plurality of persons cannot observe the display simultaneously, and it obstructs the application and development of the liquid crystal display.

As a method for enlarging the angle of visibility of the liquid crystal display by incorporating optical elements such as lenses onto the observation surface side for controlling the direction of ray transmission, there are a method wherein plano-concave lenses are disposed (JP-A-SHO 53-25399), a method wherein polyhedron lenses are disposed (JP-A-SHO 56-65175), a method wherein a transparent plate having prismatic projections is disposed (JP-A-SHO 61-148430) and a method wherein lenses are provided on respective display elements of a liquid crystal cell (JP-A-SHO 62-56930 and JP-A-HEI 2-108093), and further, besides these, there is a method wherein means for controlling a ray radiation direction of a back light source is added when it is a transmission type liquid crystal display (JP-A-SHO 58-169132, 60-202464 and 63-253329).

On the other hand, as a technology for solving a problem that, when a microlens array is combined with a liquid crystal display, it becomes difficult to observe the displayed image on account of a direct reflection on the surfaces of the lenses, proposed is a method wherein non-reflection coating layer such as an anti-reflection multi-layer thin film is provided on the surfaces of the lenses (JP-A-SHO 56-65175).

However, any of the conventional technologies as described above is poor in property for practical use and has not yet been able to solve the problem of angle of visibility. According to the investigation by the inventors of the present invention, the reason is in the fact that there are defects in the conventional technologies that obtained effect for enlarging the angle of visibility is poor and/or the image quality remarkably deteriorates.

Namely, in a method wherein a single concave lens is disposed, because a relatively large curvature is required for the lens, the thickness of the display becomes thicker in consideration of the thickness of the lens, and the feature of a liquid crystal display that it is thin is damaged as well as the displayed image becomes hard to be recognized because the observed image is contracted.

Further, in the so-called flat-plate microlens array sheet such as one wherein an area having a distribution of refractive index is provided in the interior of a planar base plate, for example, a glass plate, because a sufficiently large difference between refractive indexes cannot be obtained, the lens effect is insufficient, and a sufficient advantage for enlarging the angle of visibility cannot be achieved.

Furthermore, in a method wherein concave and convex surfaces of respective optical elements are exposed on a observation surface of a liquid crystal display, such as the conventional method for disposing plano-concave lenses, polyhedron lenses, lenticular lenses or prismatic projections of a transparent plate, not only the effect for enlarging the angle of visibility is poor, but also the display contrast ratio when the liquid crystal display is observed from the front side (from the normal-line direction of the observation surface), that is, the ratio of the luminance for displaying the brightest color to the luminance for displaying the darkest color, decreases.

In a state where there are rays entering from outside of a liquid crystal display, for example, rays from ordinary room lights (hereinafter, also referred to as merely "outer rays"), there is a case where a microlens array sheet reflects the outer rays while scattering-them and the whole of the image plane of the display becomes whity, thereby deteriorating the visibility, that is, the easiness for observing the display. Because this defect becomes more remarkable as the effect of the microlens array sheet for enlarging the angle of visibility is larger, it makes the technology for enlargement of angle of visibility more difficult.

Theoretically, the bad affection due to the reflection of outer rays can be reduced to a level to be ignored by increasing the luminance of a back light source of a liquid crystal display and radiating a quantity of light much larger than that of the outer rays reducing the display quality from the back side. In this case, however, because the output of the back light source is required to be larger, the features of small size, light weight, thinness and low power consumption in a liquid crystal display are lost and the use of the liquid crystal display equipped with such a back light source is considerably restricted.

Further, according to the investigation by the inventors of the present invention, even in the above-described method wherein a non-reflection coating layer is provided on lens surfaces, this defect cannot be solved. Because, since such a non-reflection coating layer operates effectively only to rays entering from a specified one direction, if the angle of observation is changed, the non-reflection effect due to the layer would decrease or disappear. Therefore, it is difficult to apply such a layer to a liquid crystal display requiring a property of observation from various angles.

Although there is a case where a so-called non-glare treatment (mat treatment) is applied for forming an anti-reflection coating layer in which fine random irregularity is provided on a surface, this method has only an effect for suppressing a mirror reflection and therefore any effect cannot be obtained even if it is applied to a lens.

Since the defect that the angle of visibility of a liquid crystal display is narrow is an essential problem on a liquid crystal display, the enlargement of the angle of visibility due to an improvement of an interior of a liquid crystal cell is limited, and a sufficient effect cannot be obtained by such an improvement.

SUMMARY OF THE INVENTION

An object of the present invention is to provide a microlens array sheet having a large effect for enlarging an angle of visibility and a method for attaching the microlens array sheet to a liquid crystal display and to provide a liquid crystal display equipped with the microlens array sheet which has a wide angle of visibility and enables an observation of plural persons.

Another object of the present invention is to provide a microlens array sheet having a sufficiently large effect for enlarging an angle of visibility even under an ordinary condition in which outer rays are present, and to provide a liquid crystal display equipped with the microlens array sheet which has a wide angle of visibility and enables an observation of plural persons.

To achieve these objects, improved microlens array sheets according to the present invention are herein provided.

A microlens array sheet for a liquid crystal display according to the present invention comprises a first substance layer and a second substance layer having a refractive index less than a refractive index of said first substance layer. The first and second substance layers are positioned between two planar surfaces parallel to each other. A plurality of minute unit lenses are formed by providing concave and/or convex surfaces to an interface defined between the first and second substance layers, and the plurality of minute unit lenses are arranged in a plane. When a smaller angle among two angles defined by intersection of a tangent plane of a certain point present on the interface having the concave and/or convex surfaces and one of the planar surfaces is referred to as "θ" and a point present on the interface making said "θ" a maximum value "θ max" is referred to as a point A, a refractive angle, indicated when a ray having reached the point A after entering into the microlens array sheet from a normal-line direction of a surface present on the second substance layer side exits into an atmosphere from a surface present on the first substance layer side after transmitting through the first substance layer, is not less than 30 degrees in an angle relative to a normal line of the surface present on the first substance layer side.

Another microlens array sheet for a liquid crystal display according to the present invention comprises a first substance layer, a second substance layer having a refractive index less than a refractive index of the first substance layer and ray cut-off means. The first and second substance layers are positioned between two planar surfaces parallel to each other. A plurality of minute unit lenses are formed by providing concave and/or convex surfaces to an interface defined between the first and second substance layers, and the plurality of minute unit lenses are arranged in a plane. The ray cut-off means cuts off a ray, which has reached the plane and exits from the same plane after repeating a total reflection based on a difference between the refractive indexes of the first and second substance layers at least two times, at a position on at least one of a ray entrance portion and a ray exit portion of the plane.

A further microlens array sheet for a liquid crystal display according to the present invention comprises a first substance layer, a second substance layer having a refractive index less than a refractive index of the first substance layer and ray cut-off means. The first and second substance layers are positioned between two planar surfaces parallel to each other. A plurality of minute unit lenses are formed by providing concave and/or convex surfaces to an interface defined between the first and second substance layers, and the plurality of minute unit lenses are arranged in a plane. The minute unit lenses are convex lenses, and the ray cut-off means has a property absorbing a visible ray and is formed as a sectional shape which becomes narrower in width thereof as it extends from the bottom side of the minute unit lenses toward the convex side of the minute unit lenses. The convex surfaces of the convex lenses formed on the first substance layer are located between the ray cut-off means and an adjacent ray cut-off means or at a position projecting from the tip of the ray cut-off means.

A still further microlens array sheet for a liquid crystal display according to the present invention comprises a first substance layer and a second substance layer having a refractive index less than a refractive index of the first substance layer. The first and second substance layers are positioned between two planar surfaces parallel to each other. A plurality of minute unit lenses are formed by providing concave and/or convex surfaces to an interface defined between the first and second substance layers, and the plurality of minute unit lenses are arranged in a plane. At least tip portions of convex portions of the first substance layer in the minute unit lenses are formed from a sticky or adhesive resin.

A method for attaching a microlens array sheet for a liquid crystal display according to the present invention is also provided. The microlens array sheet comprises a first substance layer and a second substance layer having a refractive index less than a refractive index of the first substance layer, and the first and second substance layers being positioned between two planar surfaces parallel to each other. A plurality of minute unit lenses are formed by providing concave and/or convex surfaces to an interface defined between the first and second substance layers, and the plurality of minute unit lenses being arranged in a plane. The method comprises the step of bringing tip portions of convex portions of the first substance layer in the minute unit lenses into contact with a surface of a liquid crystal cell.

In this method, any of the above-mentioned microlens array sheets can be used.

Further, in the present invention, liquid crystal displays using any one of the above-mentioned microlens array sheets are provided.

A liquid crystal display according to the present invention uses any one of the above-mentioned microlens array sheets, and the microlens array sheet is attached to an observation surface of a liquid crystal cell in a manner that the first substance layer is directed to a side of observation and the second substance layer is directed to a side of the liquid crystal cell.

BRIEF DESCRIPTION OF THE DRAWINGS

Some preferred exemplary embodiments of the invention will now be described with reference to the appropriate figures, which are given by way of example only, and are not intended to limit the present invention.

DETAILED DESCRIPTION OF THE PREFERRED EMBODIMENTS

Figure 1:
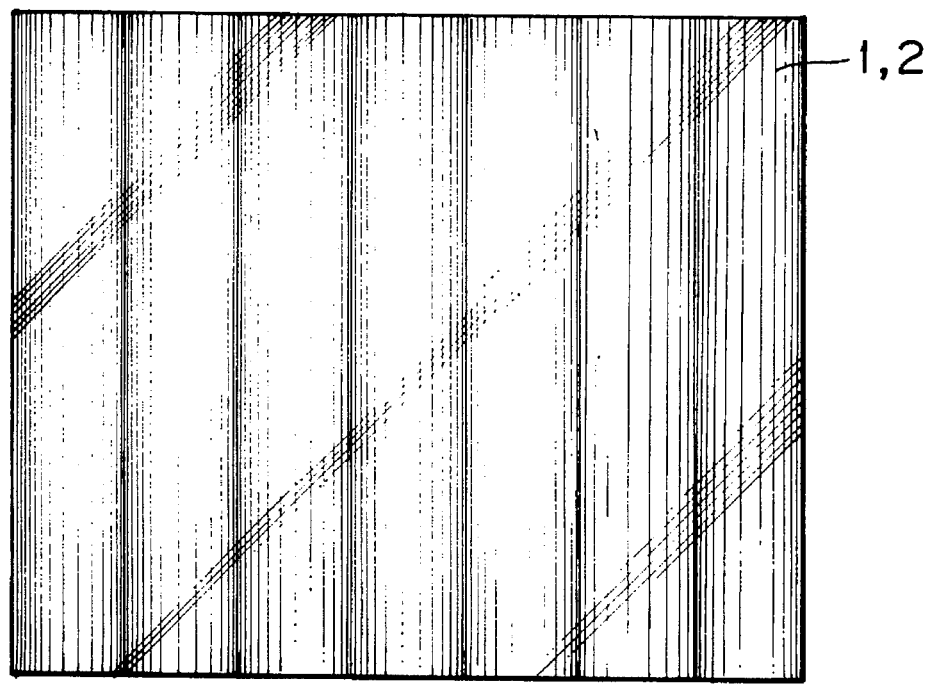
FIG. 1 is a plan view of a part of a microlens array sheet according to an example of a first embodiment of the present invention.
Figure 1:

The present invention provides typically three embodiments of microlens array sheets, methods for attaching them and liquid crystal displays equipped with them. A first embodiment relates to a microlens array sheet which can obtain an effect of sufficiently enlarging an angle of visibility when it is attached to a liquid crystal display. Remaining two embodiments relate to microlens array sheets which provide good visibility even under a condition in which outer rays such as rays from room lights or sunrays are present, maintaining the effect of enlarging an angle of visibility. Although these three embodiments are effective to the objects of the present invention, respectively, a better effect can be obtained by combining two or three embodiments.

In the present invention, a "liquid crystal display" means an image display apparatus in which an image can be directly observed at an exact size thereof, and the image is displayed by means arranged with liquid crystal optical shutters which change ray transmittance or reflectance by utilizing an electro-optical effect of liquid crystal molecules, that is, by utilizing optical anisotropy (anisotropy in refractive index), orientation, flowability and dielectric anisotropy of liquid crystal molecules, applying an electric field or sending an electric current to appropriate display elements and changing the state of orientation of liquid crystal. Further, in the present invention, a "liquid crystal cell" means a body arranged with the liquid crystal optical shutters.

In a conventional microlens array sheet such as a lenticular lens type or flat plate type microlens array sheet, as aforementioned, even if the microlens array sheet is attached to the surface of a liquid crystal cell in order to obtain a liquid crystal display with a wide angle of visibility, the effect of enlarging the angle of visibility is poor and the reduction of the image quality when observed from the front side is remarkable.

The inventors of the present invention have found that, in order to enlarge an angle of visibility without decreasing an image quality when observed from front side, a microlens array sheet arranged with minute unit lenses having a sufficiently large refractive property can be obtained by disposing first and second substance layers having a sufficiently large difference in refractive index from each other between two planar surfaces parallel to each other and providing concave and/or convex surfaces to an interface defined between the first and second substance layers. However, even when such a microlens array sheet is used, there is a case where an excellent effect for enlarging an angle of visibility cannot be obtained, or there remains a problem that the visibility decreases when outer rays are strong. Accordingly, the present invention has been completed by further proceeding the investigation, research and examinations.

In the present invention, a "microlens array sheet" (hereinafter, also referred to as "MLA") means a sheet which minute unit lenses, that is, minute unit portions having a lens function, are arranged in plane. Where, the "minute" unit portion means a sufficiently small unit portion relative to an arrangement body (MLA), and in the present invention, when the arrangement body comprises unit portions of not less than 100, the unit portion is defined as a minute unit portion. Further, the "having a lens function" means that it is not necessary to have a predetermined focal point as an ordinary single convex lens or concave lens has, and it may have a function which can refract an entered ray in an appropriate controlled direction.

Firstly, the first embodiment of the present invention will be explained.

In the present invention, the minute unit lenses are formed by providing concave and/or convex surfaces to an interface defined between the first substance layer and the second substance layer having a refractive index less than a refractive index of the first substance layer, so that each of the minute unit lenses functions as a lens.

As the shape of the concave or convex surfaces, there are a one-dimensional lens array sheet such as a lenticular lens wherein a plurality of curved surfaces each obtained by parallel transfer of a curved line such as an arc are arranged in one direction, and a two-dimensional lens array sheet wherein a plurality of dome-like curved surfaces each having a rectangular, triangular or hexagonal bottom surface are arranged two-dimensional in a plane. Further, a polyhedron shape including a combination of curved surfaces and/or flat surfaces having various angles and curvatures may be applied.

A first substance constituting the first substance layer and a second substance constituting the second substance layer are both substantially transparent substances. A glass material and a transparent plastic material are preferably used as the first substance. As the second substance, a material having a refractive index less than that of the first substance may be used, and as such a material, in addition to a glass material and a transparent plastic material, a liquid such as water and a gas such as air can be used.

The two layers composed of such first and second substances are positioned between two planar surfaces parallel to each other. The interface between the first and second substance layers are formed as a number of concave and/or convex surfaces. By such a formation, when the microlens array sheet is attached to a liquid crystal display, a good effect for enlarging the angle of visibility can be obtained.

Figure 2:
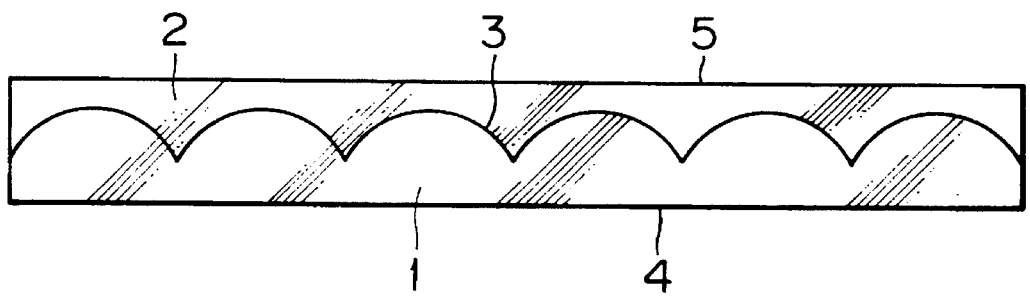
FIG. 2 is a side view of the microlens array sheet shown in FIG. 1, as viewed along a direction of arrow II.
Figure 3:
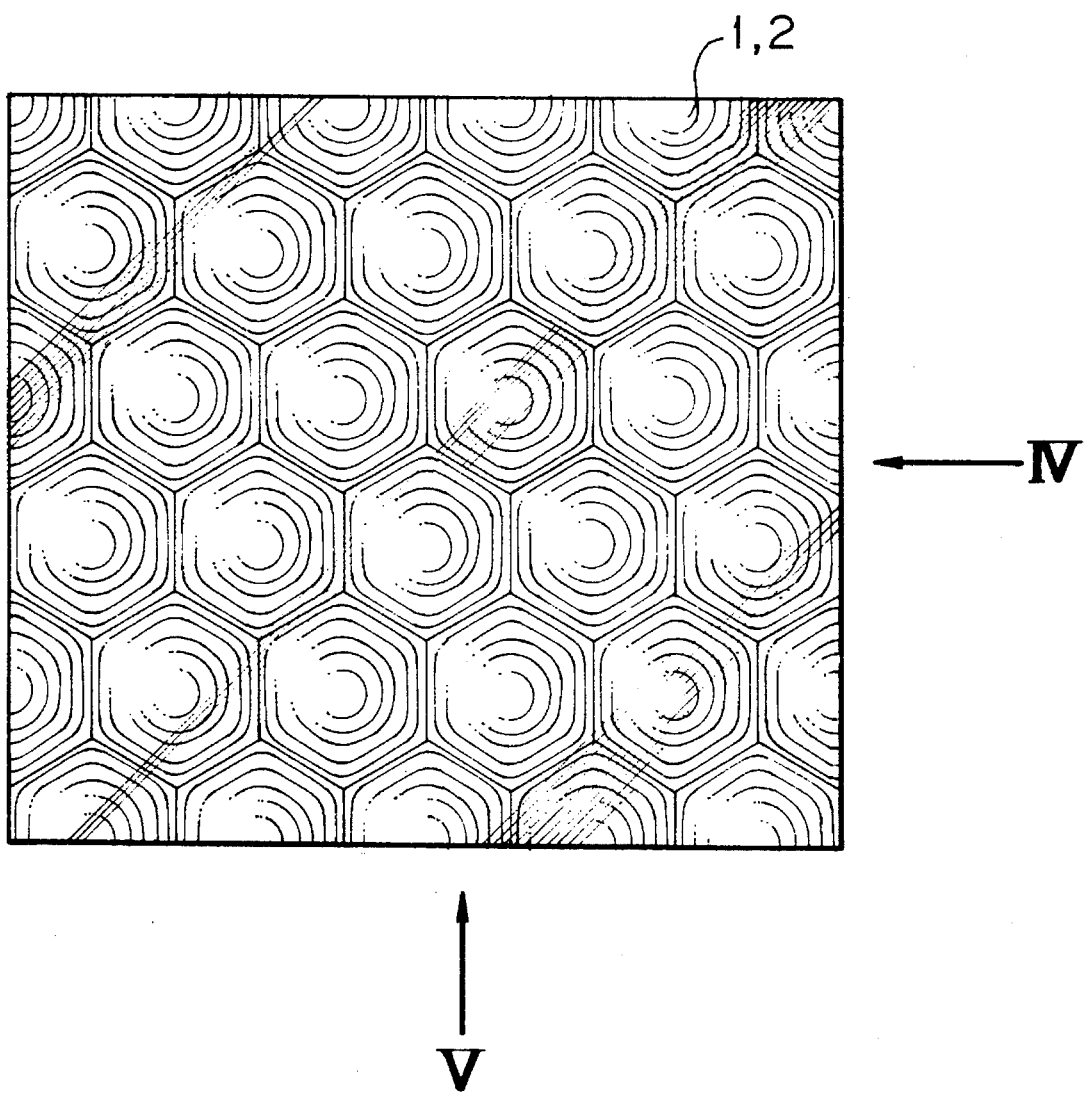
FIG. 3 is a plan view of a part of a microlens array sheet according to another example of the first embodiment of the present invention.
Figure 4:
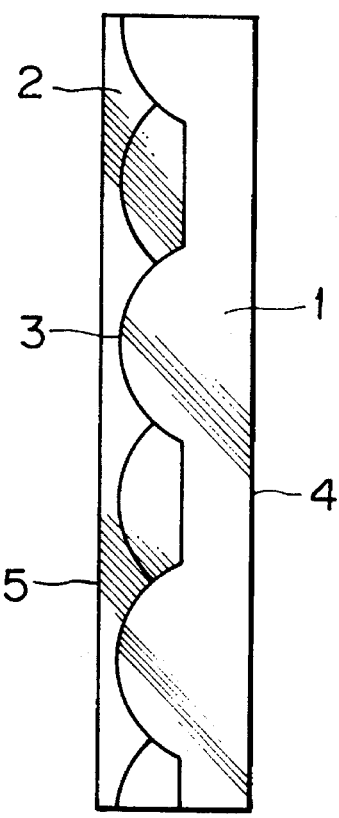
FIG. 4 is a side view of the microlens array sheet shown in FIG. 3, as viewed along a direction of arrow IV.
Figure 5:
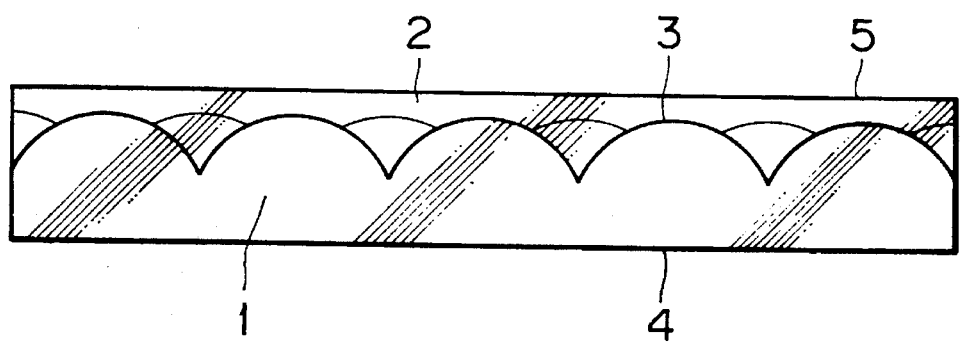
FIG. 5 is a side view of the microlens array sheet shown in FIG. 3, as viewed along a direction of arrow V.
Figure 6:
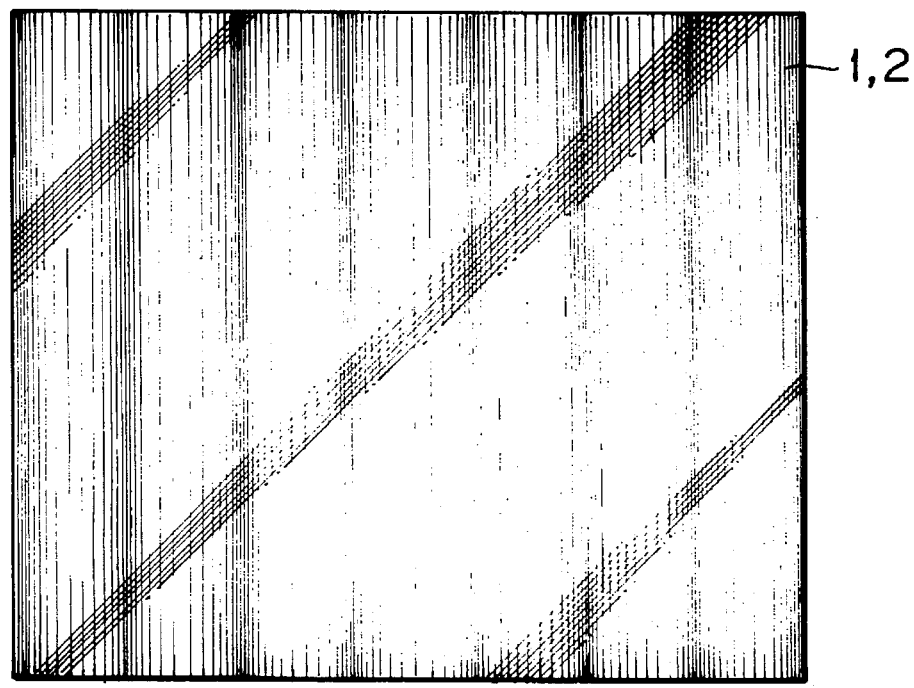
FIG. 6 is a plan view of a part of a microlens array sheet according to a further example of the first embodiment of the present invention.
Figure 7:
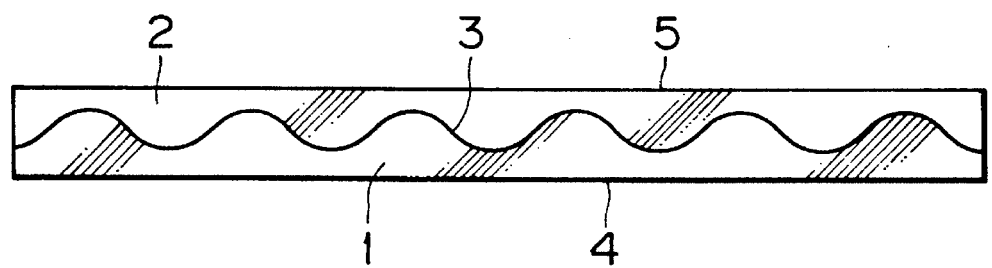
FIG. 7 is a side view of the microlens array sheet shown in FIG. 6, as viewed along a direction of arrow VII.
Figure 8:
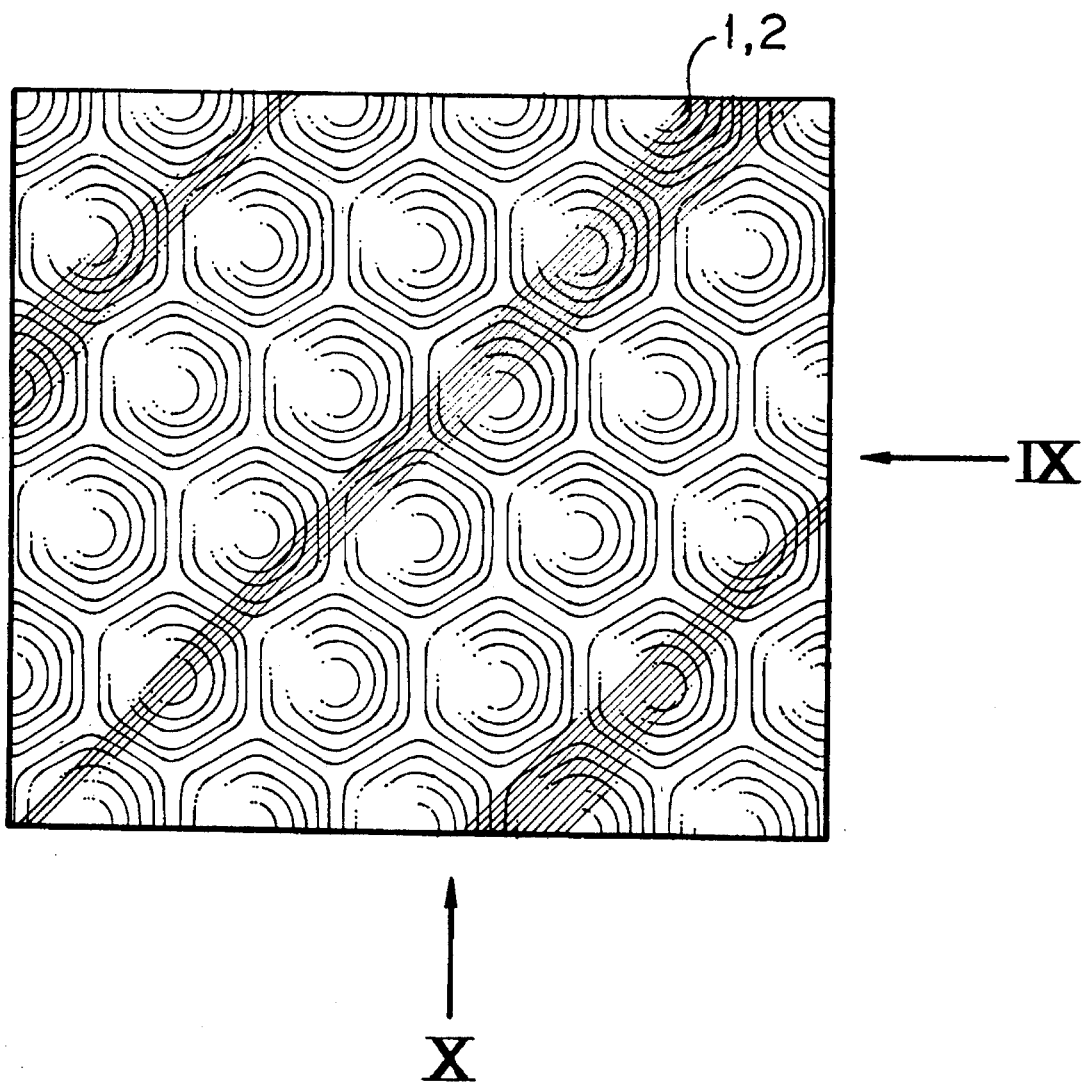
FIG. 8 is a plan view of a part of a microlens array sheet according to a still further example of the first embodiment of the present invention.
Figure 9:
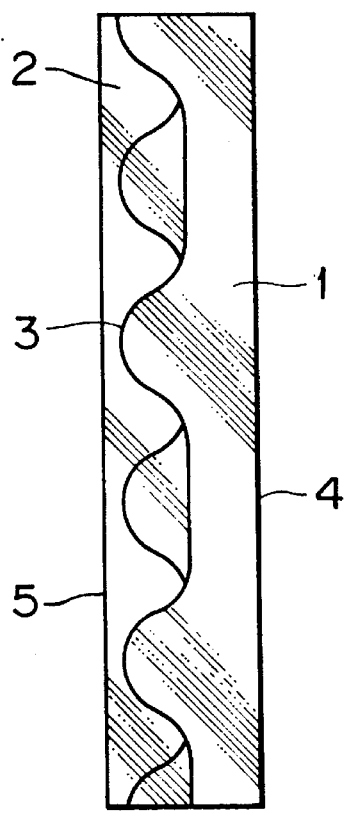
FIG. 9 is a side view of the microlens array sheet shown in FIG. 8, as viewed along a direction of arrow IX.
Figure 10:
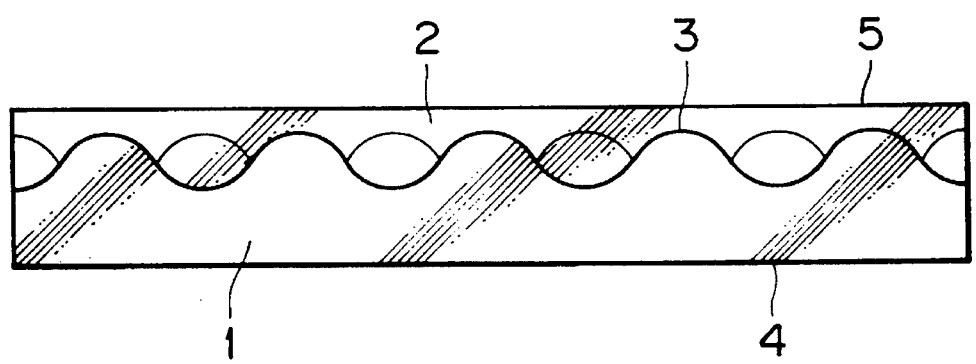
FIG. 10 is a side view of the microlens array sheet shown in FIG. 8, as viewed along a direction of arrow X.

FIGS. 1–10 show various shapes of microlens array sheets according to the present invention. The MLAs shown in FIGS. 1–10 have a first substance layer 1, a second substance layer 2, an interface 3 therebetween and planar surfaces 4 and 5 parallel to each other. FIGS. 1 and 2 show an example of a one-dimensional MLA in which a plurality of barrel type solids are arranged in one direction. FIGS. 3–5 show an example of a two-dimensional MLA in which a plurality of dome-like solids each having a hexagonal bottom are arranged two-dimensionally in a plane. FIGS. 6–10 show one-dimensional MLA and two-dimensional MLA in which the interfaces between the first and second substance layers are formed from continuous curved surfaces, FIGS. 6 and 7 show an interface with a waving shape and FIGS. 8–10 show a MLA arranged with minute unit lenses having a hexagonal shape. In the case of such a interface with a continuous curved surface, the interface between the first and second substance layers in the unit lens has both the concave and the convex.

Where, the "planar surface" means a surface substantially flat relative to the interface having concaves and/or convexes which functions as lenses. In the present invention, the planar surface means a flat surface having a mean roughness Ra of not more than $\frac{1}{5}$ of the height of the interface having concave and/or convex surfaces. Where, "a mean roughness Ra" ia measured according to JIS B-0601 (1994).

This first embodiment relates to a function of refraction of minute unit lenses constituting a microlens array sheet to obtain a sufficiently large effect for enlarging an angle of visibility. The first embodiment is characterized in that a ray entering from a normal-line direction of a planar surface exits with a refractive angle of not less than 30 degrees.

Namely, in the MLA, when a smaller angle among two angles defined by intersection of a tangent plane of a certain point present on the interface having the concave and/or convex surfaces and one of the planar surfaces is referred to as "$\theta$" and a point present on the interface making the "$\theta$" a maximum value "$\theta$ max" is referred to as a point A, a refractive angle, indicated when a ray having reached the point A after entering into the microlens array sheet from a normal-line direction of a surface present on the second substance layer side exits into an atmosphere from a surface present on the first substance layer side after transmitting through the first substance layer, must be not less than 30 degrees in an angle relative to a normal line of the surface present on the first substance layer side (hereinafter, this angle is referred to as "a maximum refractive angle $\alpha$").

Where, when the refractive index of the first substance layer is referred to as "$n_1$" and the refractive index of the second substance layer is referred to as "$n_2$", the following equation (1) is used to calculate the "$\alpha$" in a manner of geometric optics.

$$\alpha = \sin^{-1}\left[ n_1 \sin\left\{ \theta_{max} - \sin^{-1}\left( \frac{n_2 \sin \theta_{max}}{n_1} \right) \right\} \right] \quad (1)$$

From the above equation (1), it is understood that the above-described desired property of the minute unit lenses can be obtained by adequately combining the refractive indexes of the first and second substance layers and the shape of the interface between the first and second substance layers. In order to achieve this property, the refractive index of the first substance layer is preferably not less than 1.40. An angle of visibility can be sufficiently enlarged by forming the respective unit lenses to satisfy this property.

Figure 11:
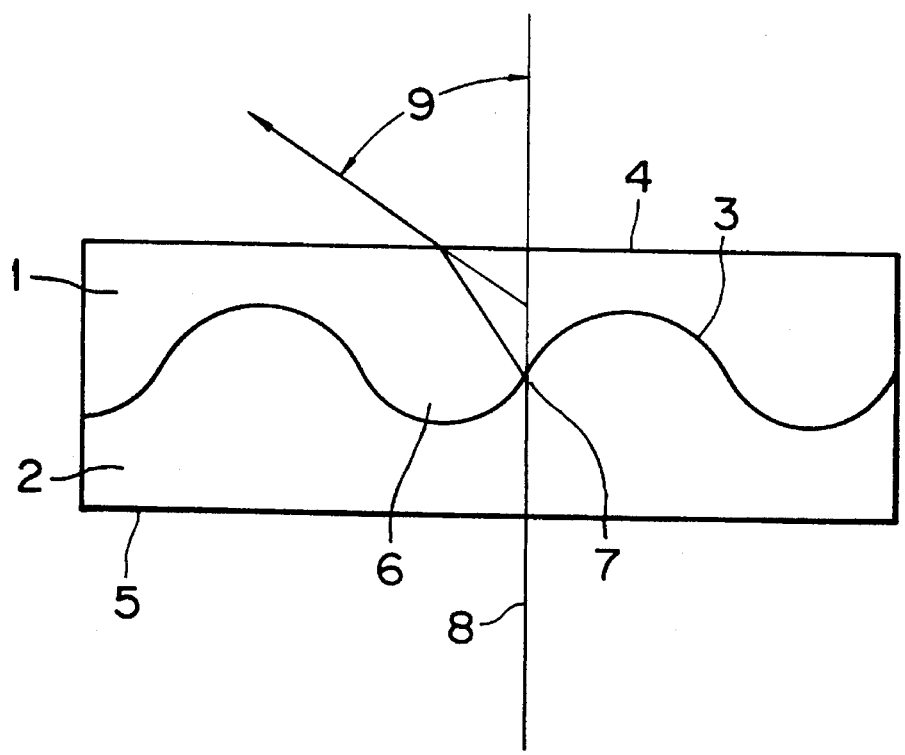
FIG. 11 is a schematic vertical sectional view of a part of a microlens array sheet according to the first embodiment of the present invention, for explaining the function of the microlens array sheet.

The more detail shape and function of the unit lenses will be explained referring to FIG. 11 which is an enlarged vertical sectional view of a part of the microlens array sheet shown in FIG. 7.

Unit lenses 6 are constituted by forming the interface 3 between the first and second substance layers 1 and 2 positioned between the planar surfaces 4 and 5 parallel to each other as a continuous waving surface. In the unit lenses 6, the point which indicates a maximum angle with respect to the angle defined by the intersection of a tangent surface of the interface 3 and the surface 4 or 5 (point A) is a point 7. Ray 8 entering from the normal-line direction of the surface 5 of the second substance layer side reaches point 7, is refracted at point 7, and after transmitting through the first substance layer 1, the ray 8 is further refracted at the surface 4 of the first substance layer side, and thereafter, it exits into the atmosphere. At that time, the angle 9 ($\alpha$) between the ray entering direction into the second substance layer 2 and the ray exitting direction to the atmosphere is not less than 30 degrees. As long as this condition is satisfied, the shape and function of the respective unit lenses can be designed depending upon the characteristic of a liquid crystal display to be applied and environment of use, as described later.

Thus, the angle of visibility of a liquid crystal display to be applied can be sufficiently enlarged by controlling the property of the microlens array sheet within the above range. However, sometimes there occurs a case where the image on the liquid crystal display may be hard to be clearly observed by the reflection of outer rays entering from the observation side at the interface having concave and convex surfaces. In such a case, an appropriate anti-reflection property can be provided to the microlens array sheet.

As a method for providing such an anti-reflection property, the following methods can be applied. However, the method is not restricted by the following ones.

(1) A method for cutting the outer rays off by painting an appropriate portion with black color which is not present on the path of the image rays entering from a liquid crystal cell into the microlens array sheet but present on the reflection path of the outer rays. Where, the "appropriate portion which is not present on the path of the image rays" means not a portion through which any beam radiated from the liquid crystal cell does not pass but a portion through which a beam required for making a good image among the beams radiated from the liquid crystal cell does not pass.

(2) A method for applying a non-reflection coating due to an optical multi-layer thin film.

(3) A method for coloring the respective unit lenses of the microlens array sheet and reducing the influence due to the reflection of the outer rays utilizing the fact that the reflection path length of the outer rays is longer than the optical path length for image.

(4) A method for bringing the tip portions of the convex portions of the first substance layer in the unit lenses of the microlens array sheet into contact with the liquid crystal cell and transmitting the outer rays directly into the interior of the liquid crystal cell.

(5) A method for enclosing the outer rays in the first substance layer by providing another layer having a refractive index more than that of the first substance layer onto the surface of the first substance layer with the concave and convex surface.

In the above method (5), although there occur portions at which the interface between the first and second substance layers specified by the present invention does not exist, in the present invention, the interface defined between the above-described another layer provided on the first substance layer and the second substance layer is included in the "interface as defined by the claims".

Among the above five methods, the methods (1), (4) and (5) are preferred from the viewpoint of effect obtained, and further, the method (1) is particularly preferred.

Next, a microlens array sheet according to the second embodiment of the present invention will be explained.

The second embodiment of the present invention relates to a microlens array sheet which can suppress the reflection of outer rays even under an environment condition of strong outer rays and can suppress the reduction of visibility, and is characterized in that ray cut-off means having a specified shape is incorporated into a microlens array sheet having specified minute unit lenses at a specified position.

In a microlens array sheet, a mechanism reducing the visibility under a condition where outer rays are present has been investigated. As a result, it has been found that a main reason of the reflection of the outer rays is that the outer rays entering from a higher-refractive index substance layer side into a microlens array sheet reflect in a manner of total reflection at a position which is present in a interface defined between the higher-refractive index substance layer and a lower-refractive index substance layer and has an angle more than a critical angle of reflection determined based on a difference between the refractive indexes of both substance layers, and further, after the reflected rays repeat total reflection in the same manner, the rays exit from the surface through which the rays has entered (hereinafter, this phenomenon is also called "recursive reflection at a lens surface"). On the other hand, however, since the concave and convex portion having a large angle relative to the observation surface which causes the first total reflection is a portion contributing to a great effect for enlarging an angle of visibility when the microlens array sheet is attached to a liquid crystal display, the reflection of the outer rays becomes strong as intended to obtain a greater effect for enlarging the angle of visibility. Therefore, this mechanism has been found to be a problem restricting the use of the liquid crystal display equipped with the microlens array sheet.

Accordingly, as the result of investigation of a method for greatly reducing the reflection of the outer rays while maintaining the effect for enlarging the angle of visibility of the liquid crystal display, it has been found that this problem can be solved by providing ray cut-off means at an optimum position. Namely, the ray cut-off means is disposed so that the ray cut-off means can cut off a ray, which has entered from the normal-line direction of the minute unit lens arrangement plane of the first substance layer side with a higher refractive index and has reached the unit lens arrangement plane and exits from the lens arrangement plane toward the first substance layer side after repeating a total reflection based on a difference between the refractive indexes of the first substance layer and the second substance layer with a lower refractive index at least two times, at a position on at least one of a ray entrance portion and a ray exit portion of the lens arrangement plane.

Where, the minute unit lens arrangement plane means a reference plane of arrangement of the concave and/or convex surfaces forming the interface between the first and second substance layers. Although in geometrical definition the lens arrangement plane means a flat plane which is parallel to a surface of a liquid crystal cell to be equipped with the microlens array sheet among flat planes which do not intersect the waving surface formed by the arranged concave and/or convex surfaces but contacts with the waving surface, as the definition on actual production, it means an appropriate plane in the first substance layer which does not intersect the waving surface formed by the concave and/or convex surfaces.

Further, the minute unit lens arrangement plane of the first substance layer side means a minute unit lens arrangement plane present on the first substance layer side among two minute unit lens arrangement planes present on both sides of the waving surface formed by the concave and/or convex surfaces. Similarly, the minute unit lens arrangement plane of the second substance layer side means a minute unit lens arrangement plane present on the second substance layer side among the two minute unit lens arrangement planes.

The microlens array sheet according to the second embodiment of the present invention will be hereunder explained in more detail referring to the drawings.

Figure 22:
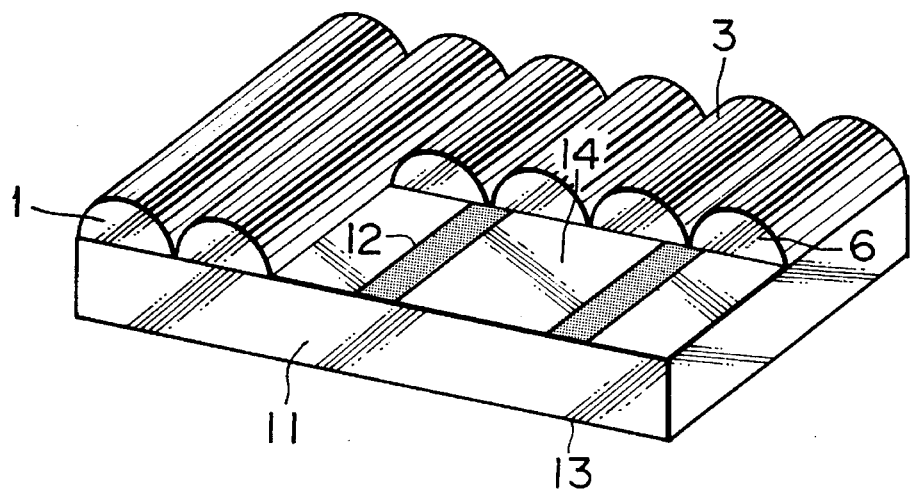
FIG. 22 is a schematic perspective view of a part of a microlens array sheet according to a still further example of the second embodiment of the present invention.

FIG. 22 shows an example of a structure of a microlens array sheet according to the present invention. Ray cut-off straps 12 (ray cut-off means) are provided on a transparent plastic plate 11, and further, barrel type unit lenses 6 each having a semicircular cross section are arranged thereon in one direction. In this case, the unit lens arrangement plane is a surface 14 of plastic plate 11 on which ray cut-off straps 12 are formed. The waving surface formed by concave and/or convex surfaces is formed as a surface 3 of the arranged barrel type unit lenses 6. The first substance layer is composed of plastic layer 1 forming the barrel type unit lenses 6. The second substance layer is composed of air layer above the barrel type unit lenses 6 (not shown).

Figure 14:
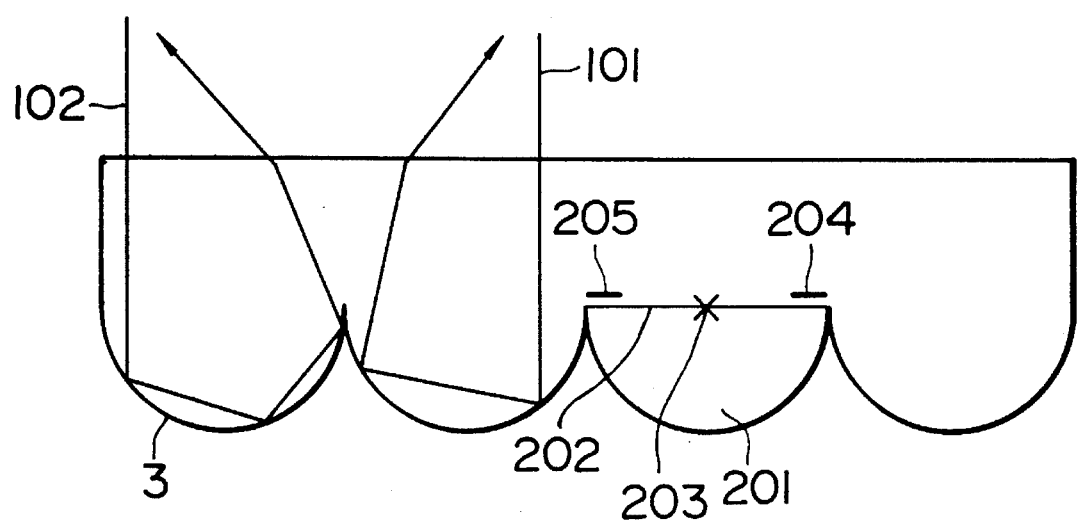
FIG. 14 is a vertical sectional view of a conventional microlens array sheet.
Figure 23:
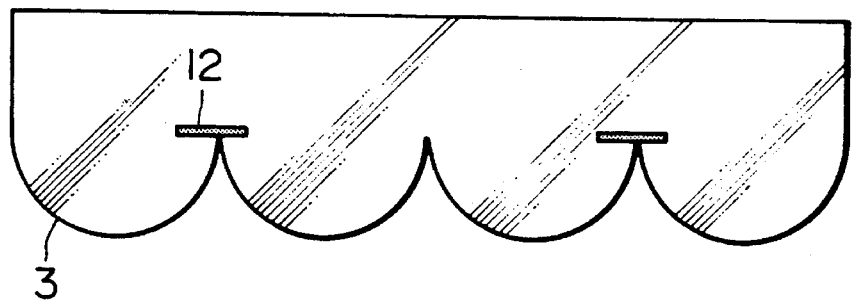
FIG. 23 is a partial vertical sectional view of the microlens array sheet shown in FIG. 22.

FIG. 23 shows a vertical section of the microlens array sheet depicted in FIG. 22, taken along a direction perpendicular to the surface 14 and parallel to the arrangement direction of the unit lenses. FIG. 23 mainly shows the relationship between the position of ray cut-off straps 12 and the waving surface 3 formed by barrel type unit lenses 6. FIG. 14 shows an example of a vertical section of a conventional microlens array sheet which has a shape similar to that shown in FIG. 22 but does not have ray cut-off means and is formed as a so-called usual lenticular lens.

The function of the ray cut-off straps 12 will be explained comparing FIG. 23 with FIG. 14.

As well known, a total reflection occurs under a condition where, when a ray reaches an interface between a higher-refractive index substance and a lower-refractive index substance from the side of the higher-refractive index substance, an angle between a going direction of the ray and a normal line of the interface is not less than a critical reflection angle "φ c" shown by the following equation(2).

$$\sin(\phi c) = n_2/n_1 \quad (2)$$

Where, $n_2$ indicates a refractive index of a lower-refractive index substance, and $n_1$ indicates a refractive index of a higher-refractive index substance.

In FIG. 14, when the refractive index of the lens layer 1 of the higher-refractive index substance is 1.5 and the refractive index of the air layer of the lower-refractive index substance is 1.0, the critical reflection angle φ c is about 41.8 degrees, and rays reaching the plane 3 with an angle of not less than this critical angle all reflect.

In FIG. 14, among rays entered from the first substance layer side as outer rays, i.e., rays entering from the base flat surface, for example, a ray 101 entering from the normal-line direction of the base flat surface reflects two times at the plane 3, and thereafter exits from the base flat surface. Another ray 102 reflects three times at the plane 3, and thereafter exits from the base flat surface. Thus, in the conventional technology of the microlens array sheet, the rays exiting from the same surface as that of ray entrance after repeated total reflection have been main reason causing the reflection of outer rays.

Although the outer rays enter not only from the normal-line direction of the lens arrangement plane but also from various direction with various angles, the inventors of the present invention have found that the rays exiting from the ray entering surface after repeated total reflection satisfying the above-described condition all pass through a certain constant area on the unit lens arrangement plane 14. The area is presented as an area where a ray, among rays entering from the normal-line direction of the unit lens arrangement plane of the first substance layer, exiting from the unit lens arrangement plane of the first substance layer after repeated total reflection of at least two times intends to pass through the unit lens arrangement plane. In this case, in a semi-circle 201 which is a section of a unit lens, the area is one of a portion 204 and a portion 205 which are present on a chord 202 of the semi-circle 201 and apart from a center 203 of the semi-circle 201 by a distance of not less than ⅔ of the radius "r" of the semi-circle 201. Namely, all of the rays exitting from the ray entrance surface after repeated total reflection enter from the portion 204 or 205 on the lens arrangement plane, the ray entering from the portion 204 exits from the portion 205, and the ray entering from the portion 205 exits from the portion 204. Where, although the unit lens arrangement plane 14, chord 202 of the semi-circle 201 and portions 204 and 205 essentially are all present on a single plane, i.e., all of these coincide, these are shown as separated planes in FIG. 14 for explanation.

Accordingly, in the microlens array sheet according to the present invention, ray cut-off straps 12 are provided on portions corresponding to the portions 204 or 205 of the sheet shown in FIG. 14, as illustrated in FIG. 23. Although the ray cut-off straps 12 are provided on either portions 204 or portions 205 in FIG. 23, they may be provided on both the portions 204 and portions 205. Further, in a case where a slight reflection of outer rays can be allowed from the environment for use of a liquid crystal display or the property of a back light source, the ray cut-off means may be formed smaller than that shown in FIG. 23.

In this ray cut-off strap 12, the particular characteristic is not only that the reflection of outer rays is extremely efficiently prevented but also that rays entering from the air layer side which becomes a liquid crystal display side and transmitting in the normal-line direction of the unit lens arrangement plane 14 which becomes a observation side or a direction near the normal-line direction remain substantially unaffected. Namely, even in the conventional microlens array sheets, there is almost no ray which transmits from a liquid crystal display side through the portions provided with the ray cut-off means. Therefore, when the microlens array sheet is attached to a liquid crystal display and the image is observed from the front of the display (from the normal-line direction of the observation surface or a direction near the normal-line direction), there is almost no harmful influence due to the presence of the ray cut-off means such as reduction of luminance.

Although FIGS. 22 and 23 show an example wherein ray cut-off means are efficiently disposed in a one-dimensional microlens array sheet arranged with unit lenses in one direction, such ray cut-off means can be provided similarly for a two-dimensional microlens array sheet arranged with unit lenses in two directions.

Further, although the above example has been explained as to ray cut-off means having a film or membrane shape, the shape of the ray cut-off means according to the present invention is not particularly restricted.

Furthermore, the ray cut-off means is preferably provided at a position near the waving surface formed by concave and/or convex surfaces as close as possible, and the minimum distance between the ray cut-off means and the waving surface is preferably smaller than the depth of the waving surface. More preferably, at least a part of the ray cut-off means contacts with the waving surface. From such a point of view, the shape of the waving surface of the minute unit lens is preferred to be optically convex shape. Namely, the shape is formed such that, as the angle defined between the minute unit lens arrangement plane of the first substance layer side composed of a higher-refractive index substance and a tangent surface of a point on the waving surface becomes larger, the waving surface approaches the minute unit lens arrangement plane of the first substance layer side.

In the shape and the property of the ray cut-off means and the positional relationship between the ray cut-off means and the minute unit lenses, preferably, the ray cut-off means has a property absorbing a visible ray and is formed as a sectional shape which becomes narrower in width thereof as it extends from the bottom side of the minute unit lenses toward the convex side of said minute unit lenses (hereinafter, this shape is also called "taper section"), and convex portions of the convex lenses formed on the first substance layer are located between the ray cut-off means and an adjacent ray cut-off means or at a position projecting from the tip of the ray cut-off means.

The effect for enlarging an angle of visibility when attached to a liquid crystal display can be further improved by forming the ray cut-off means in such a taper section, as compared with the ray cut-off means having a film or membrane shape.

Further, since the ray cut-off property (property absorbing visible rays) of the ray cut-off means becomes stronger as approached to the edge portion of the minute unit lens where the reflection of outer rays becomes stronger, the recursive reflection at the lens surface can be efficiently suppressed, as well as, since the ray cut-off means is formed in a taper section, the rays for image radiated from a liquid crystal cell side almost are not cut. Namely, the reflection of outer rays can be efficiently suppressed without decreasing the brightness of the image.

In this case, as the shape of the taper section of the ray cut-off means, various shapes such as a triangle, a trapezoid, a semi-circle, a reversed T shape and a shape enclosed an appropriate curve can be considered. Among these shapes, a triangle and a reversed T shape (for example, a shape formed by depressing two sides of a triangle toward inside thereof is included in this shape) are preferred. Further, it is not necessary to form the whole of the ray cut-off means with a material capable of absorbing visible rays, and as long as a sufficient ray cut-off property can be obtained, a method for providing the property for absorbing visible rays only to the surface of the ray cut-off means also can be employed.

The width of the bottom and the height of the ray cut-off means having a taper section can be determined from a property to be required and the property and the shape of the minute unit lenses. Namely, the width is preferably determined such that a ray, which has entered from the normal-line direction of the minute unit lens arrangement plane of the first substance layer side with a higher refractive index and has reached the unit lens arrangement plane and exits from the lens arrangement plane toward the first substance layer side after repeating a total reflection based on a difference between the refractive indexes of the first substance layer and the second substance layer with a lower refractive index at least two times, can be absorbed, as aforementioned. The height and the shape are preferably determined so that the ray cut-off means does not overlap the area through which the rays radiated from the liquid crystal cell side and required for making a good image transmit. Where, the "rays radiated from the liquid crystal cell side and required for making a good image" means rays for image radiated in a range of angle of visibility in which a good image can be obtained when the liquid crystal cell is observed (hereinafter, also referred to as merely "a range of effective angle of visibility of a liquid crystal cell"), and in the present invention, it means a range of observation direction which can obtain 1/5 of the maximum contrast ratio in an observation direction realizing a best display quality.

Furthermore, in the present invention, the material forming the ray cut-off means is preferred to be colored substantially black. With respect to the property for cutting visible rays off of the material, the optical density of the thickest portion when formed as a ray cut-off means is preferably not less than 0.5, more preferably not less than 1.0.

FIGS. 12, 13, 15–17 shows other types of microlens array sheets according to the second embodiment of the present invention.

Figure 12:
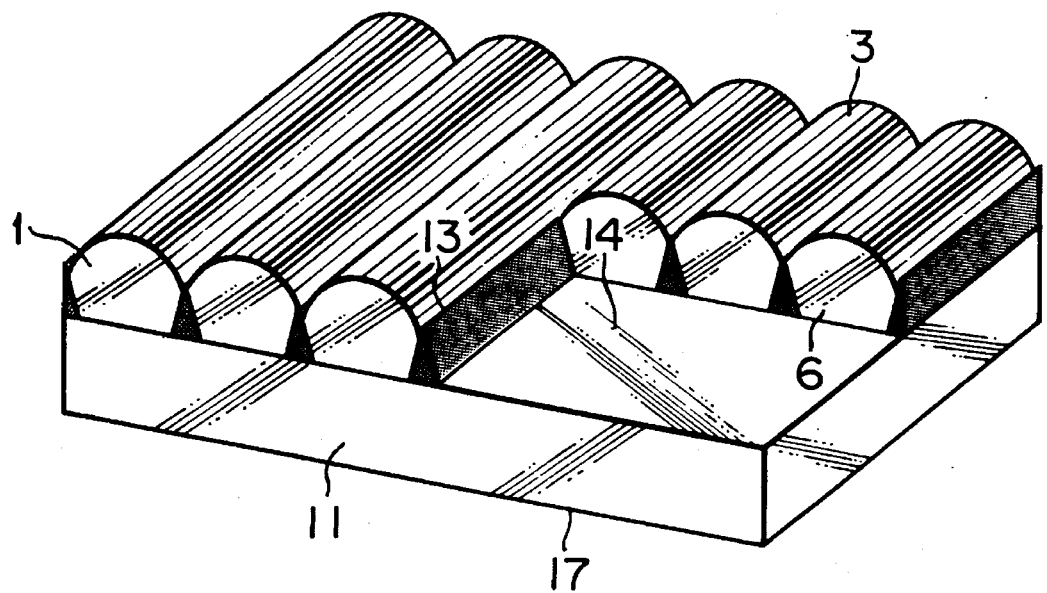
FIG. 12 is a schematic perspective view of a part of a microlens array sheet according to an example of a second embodiment of the present invention.
Figure 13:
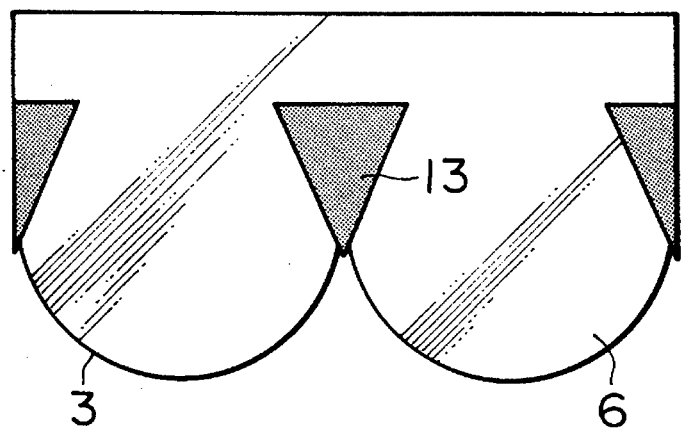
FIG. 13 is a partial vertical sectional view of the microlens array sheet shown in FIG. 12.

FIG. 12 shows an example of a microlens array sheet having ray cut-off means with a taper section. Ray cut-off bodies 13 each having a taper section of a triangle shape are provided on a surface 14 of a transparent plastic pilate 11. The respective ray cut-off bodies 13 extend along the extending direction of barrel type minute unit lenses 6 arranged on the plate 11 in one direction. Minute unit lenses 6 are composed of a transparent plastic. Each ray cut-off body 13 is disposed between unit lenses 6 adjacent to each other. FIG. 13 is an enlarged sectional view of a part of the microlens array sheet shown in FIG. 12, cut along a direction perpendicular to unit lens arrangement surface 14 and parallel to the arrangement direction of the unit lenses. FIG. 13 mainly shows a preferred shape of ray cut-off body 13 and the positional relationship between the ray cut-off bodies 13 and the plane 3 formed by the convexes of unit lenses 6.

Although an example providing ray cut-off means to a one-dimensional microlens array sheet, in which minute unit lenses are arranged in one direction, is shown in FIGS. 12 and 13, such ray cut-off means can be provided similarly to a two-dimensional microlens array sheet in which minute unit lenses are arranged in two direction.

Further, the shape and position of ray cut-off means with a taper section and the shape of minute unit lenses are not restricted by the above-described conditions. For example, FIGS. 15–17 briefly show various shape and position of ray cut-off means 13 and various shape of minute unit lenses 6.

Next, a microlens array sheet according to the third embodiment of the present invention will be explained.

The third embodiment of the present invention relates to an attachment of a microlens array sheet which can suppress the reflection of outer rays even under an environment condition of strong outer rays, and is characterized in that at least tip portions of the convex portions of the first substance layer are brought into contact with a surface of a liquid crystal cell.

As aforementioned, the microlens array sheet according to the present invention comprises a first substance layer and a second substance layer having a refractive index less than a refractive index of the first substance layer, the first and second substance layers are positioned between two planar surfaces parallel to each other, and a plurality of minute unit lenses are formed at an interface defined between the first and second substance layers by providing concave and/or convex surfaces to the interface.

In such a microlens array sheet, in a state of merely disposing it on a surface of a liquid crystal cell, there is a problem in an environment with outer rays that the visibility when constituted to a liquid crystal display decreases by the recursive reflection of the outer rays at the lens surfaces.

Accordingly, as the result of investigation of a method for greatly reducing the reflection of the outer rays while maintaining the effect for enlarging the angle of visibility of the liquid crystal display, it has been found that the angle of visibility of the liquid crystal display can be enlarged without reducing the visibility by bringing the tip portions of the convex portions of the first substance layer in the unit lenses of the microlens array sheet into contact with the liquid crystal cell and transmitting the outer rays into the interior of the liquid crystal cell.

Figure 18:
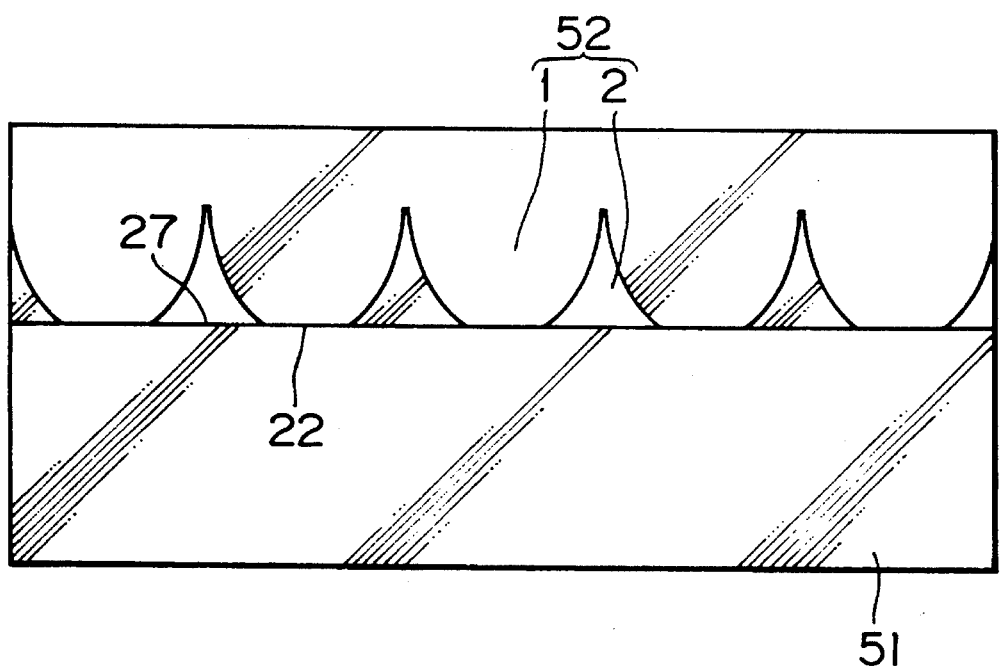
FIG. 18 is a schematic vertical sectional view of a part of a liquid crystal display equipped with a microlens array sheet according to an example of a third embodiment of the present invention.
Figure 19:
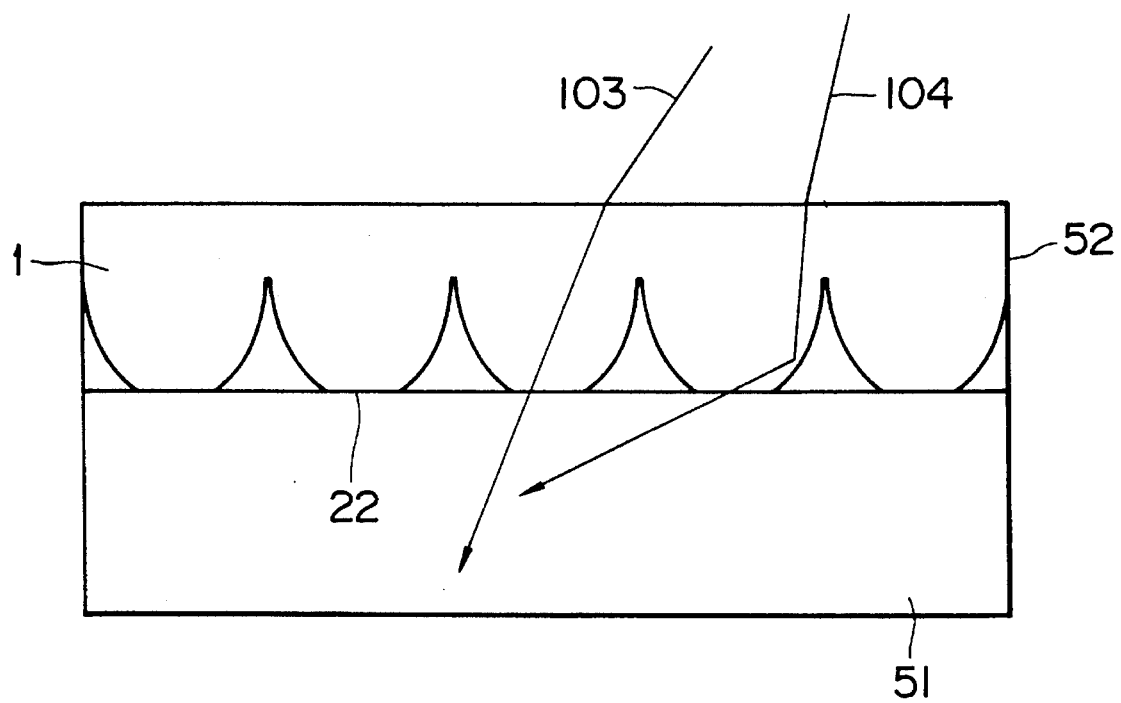
FIG. 19 is a schematic vertical sectional view of the liquid crystal display equipped with the microlens array sheet shown in FIG. 18 for explaining paths of outer rays.

Namely, in a state of merely placing a microlens array sheet with minute unit lenses onto the observation surface of a LCD, a recursive reflection at the lens surface occurs as explained in FIG. 14. For preventing this, as shown in FIG. 18, when tip portions 22 (tip areas) of convex portions of the first substance layer 1 of a microlens array sheet 52 are brought into contact with a surface 27 of a liquid crystal cell 51, a part of the first substance layer 1 is contacted directly with the surface 27 of the liquid crystal cell 51 having a relatively small difference in refractive index (that is, the refractive index of the liquid crystal cell 51 is relatively close to that of the first substance layer 1), and the condition for critical reflection shown by the aforementioned equation (2) is not satisfied at a part of the recursive reflection path.

As a result, since the rays 103 and 104 entering into the microlens array sheet are introduced into the liquid crystal cell 51 without causing recursive reflection, the recursive reflection at the lens surface can be prevented.

Although the method for contacting the tip portions of the convex portions of the first substance layer of the microlens array sheet with the surface of the liquid crystal cell is not particularly restricted as long as such an anti-reflection property for outer rays can be obtained, the following concrete methods will be listed from the viewpoint of easiness of operation.

(1) A method for forming at least tip portions of the convex portions of the first substance layer in the minute unit lenses from a sticky or adhesive material, and attaching the microlens array sheet to the surface of the liquid crystal cell utilizing the sticky or adhesive property of the material.

(2) A method for applying a sticky or adhesive material onto at least tip portions of the convex portions of the first substance layer in the minute unit lenses, and attaching the microlens array sheet to the surface of the liquid crystal cell utilizing the sticky or adhesive property of the applied material.

(3) A method for applying a sticky or adhesive material onto at least the portions of the surface of the liquid crystal cell which face at least tip portions of the convex portions of the first substance layer in the minute unit lenses, and attaching the microlens array sheet to the surface of the liquid crystal cell utilizing the sticky or adhesive property of the applied material.

(4) A method for applying a sticky or adhesive material onto at least the portions of the surface of a transparent base plate prepared separately, which face at least tip portions of the convex portions of the first substance layer in the minute unit lenses, attaching the microlens array sheet to the surface of the base plate utilizing the sticky or adhesive property of the applied material, and thereafter, attaching the microlens array sheet to the liquid crystal cell via the base plate.

Where, the "sticky or adhesive material" means a material generally called a sticking agent or an adhesive, and means a material which can closely contact the tip portions of the minute unit lenses to the observation surface of the liquid crystal cell when the microlens array sheet is attached to the liquid crystal cell. As such a material, a material composed of a polymeric resin composition is preferred from the viewpoint of easiness of handling.

The resin composition is selected depending upon the sticky or adhesive property to be required in consideration of the conditions such as the degree of polymerization and the glass transition temperature of the resin. Although such a resin is not particularly limited, as typical materials, a thermoplastic resin and an ultraviolet curing type resin can be employed, and among these resins, an ultraviolet curing type resin is preferably employed from the viewpoint of easiness of formation of minute unit lenses.

Figure 20:
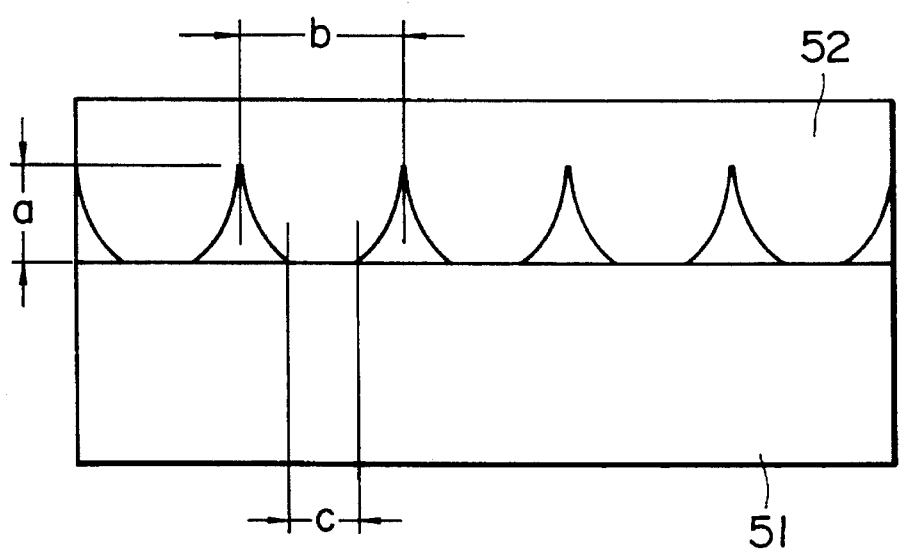
FIG. 20 is a schematic vertical sectional view of a part of a liquid crystal display equipped with a microlens array sheet according to the third embodiment of the present invention, for explaining an example with respect to sizes and shapes of parts thereof.

As the formation and dimension in the state where the tip portions of the convex portions of the first substance layer of the microlens array sheet are contacted with the surface of the liquid crystal cell, as shown in FIG. 20, lens height (a), lens pitch (b) and width of a flat portion of the tip portion (c) preferably satisfy the following relationship. Namely, a/b is preferably in the range of $1/3$ to $5/1$, more preferably in the range of $1/2$ to $4/1$, and b/c is preferably in the range of $2/1$ to $10/1$, more preferably in the range of $2/1$ to $5/1$.

In this embodiment according to the present invention, when the second substance layer is composed of air, a further great effect can be obtained. Namely, the attachment of the microlens array sheet to a liquid crystal cell can be further facilitated and a great effect for enlarging an angle of visibility can be easily obtained.

In the operation of attaching the microlens array sheet to a liquid crystal cell, when the second substance layer is composed of a solid material such as a transparent plastic, it is possible to contact and attach the microlens array sheet to the liquid crystal cell by providing the sticky or adhesive property to the second substance layer itself or laminating a sticky or adhesive layer onto the second substance layer. However, when the second substance layer is composed of air, it is necessary to support the microlens array sheet on the liquid crystal cell by using the first substance layer or utilizing the rigidity of a base material forming the first substance layer or using an additional member supporting the microlens array sheet. Therefore, in such a case, this embodiment is very effective.

Further, although a large difference between the refractive indexes of the first and second substance layers is required in order to obtain a great effect for enlarging an angle of visibility, refractive indexes of generally used transparent materials concentrate in a range of 1.4 to 1.6, and it is difficult to obtain a great effect for enlarging an angle of visibility by selection from these materials. Therefore, a special high or low refractive index material must be used to obtain such a great effect. However, when air is used as the second substance layer, it becomes possible to obtain a great effect for enlarging an angle of visibility even by a generally used material and the air.

Next, supplemental matters common to the above-described respective embodiments will be explained.

An antistatic treatment, a hard coating treatment, an anti-reflection treatment due to an optical multi-layer thin film, and a non-glare treatment such as one performed on an observation surface of a conventional liquid crystal display can be performed as needed on a surface of the microlens array sheet according to the present invention which becomes an observation surface when attached to a liquid crystal display, for example, on the surface 4 of the first substance layer in the microlens array sheet shown in FIGS.

1 to 10, or on the surface 17 opposite to the surface 14 provided with the ray cut-off means of the transparent plastic base plate 11 in the structure shown in FIG. 12.

Further, in order to facilitate the attachment of the microlens array sheet according to the present invention to a liquid crystal cell, the second substance layer or the tip portions of the convex portions of the first substance layer penetrated through the second substance layer can be composed of a sticky or adhesive material, or a layer of a sticky or adhesive material can be added onto the surface of the second substance layer or the tip portions of the convex portions of the first substance layer.

The base plate on which the MLA is formed can be selected depending on the use, and it is not always necessary. The most general method is to use a MLA sheet formed on a glass or a transparent plastic film. In this case, a base plate composed of a transparent plastic film is preferred from the viewpoint of easiness of handling and formation of lens surfaces. Further, a MLA also can be incorporated into a polarizing film equipped in a liquid crystal display. Particularly, in a case of a polarizing film having a structure wherein a protecting film is stacked on a polarizing element, a polarizing film with a MLA can be realized by using a protecting film in which the MLA is preformed, and this method is preferred because a liquid crystal display equipped with the MLA according to the present invention can be produced without adding any process to the conventional process for producing liquid crystal displays.

The microlens array sheet according to the present invention can be obtained by applying the conventional production process for lenticular lenses or Fresnel lenses or by a new process.

Namely, in order to obtain the first or the second layer, a method for preparing a mold in which shapes for required lenses are formed, charging a material such as a resin into the mold and transferring the molded lenses onto a sheet, a method for preparing a similar mold and charging a resin to form a base portion and lens portions simultaneously, a method for uniformly applying an optical curing resin such as an ultraviolet curing resin onto a base such as a plastic film, radiating rays only on required portions to cure the portions, and thereafter removing unnecessary portions, a method for forming lenses by mechanically processing the surface of a base such as a plastic or a glass, and a method combining these methods can be employed. However, the process is not particularly restricted by these methods.

Among the above-described methods, a method for charging an ultraviolet curing resin into a mold, and while transferring the resin onto a base of a plastic film, curing the resin by radiating an ultraviolet ray is preferred because a continuous production is possible and the productivity is good and further a precise processing can be performed.

After the first or the second substance layer is thus obtained, in a case where a material other than air is used as the second substance, a microlens array sheet according to the present invention can be obtained by charging the material.

Further, particularly in a case of obtaining a microlens array sheet according to the second embodiment of the present invention, the ray cut-off means must be provided at proper positions precisely not only relative to the whole of the microlens array but also relative to each of the microlenses. In this case, a method for firstly forming the ray cut-off means on a base plate such as a plastic film by printing, photolithography or processing, then laminating a radial ray curing resin such as an ultraviolet curing resin on the surface formed with the ray cut-off means of the base, curing the portions between the ray cut-off means to be formed as minute unit lenses by radiating a radial ray such as an ultraviolet ray from the surface side of the base plate opposite to the surface formed with the ray cut-off means utilizing the radial ray cut-off property of the ray cut-off means themselves, and thereafter removing the noncured portions can be preferably employed.

Next, the liquid crystal display according to the present invention will be explained.

Generally a liquid crystal display can freely display an information by a liquid crystal cell into which display elements having an appropriate shape are incorporated, and there are various types from a type wherein a single information is displayed by a single picture such as a single pictograph to a dot-matrix type which can display a large capacity of information by a liquid crystal cell in which dot display elements are arranged lengthwise and crosswise. Although the liquid crystal display according to the present invention can be applied to any type of liquid crystal display, a great effect for enabling the observation by plural persons by enlarging an angle of visibility can be obtained particularly in a dot-matrix type liquid crystal display having a large capacity of information.

Where, the liquid crystal cell means a body in which a plurality of optical shutter mechanisms are arranged as display units, and each of the optical shutter mechanisms controls ray transmittance utilizing an electro-optical effect of liquid crystal molecules, that is, a difference in optical property caused between a voltage-applied portion and a voltage-non-applied portion by changing orientation of liquid crystal molecules by applying an electric field or sending an electric current to the liquid crystal molecules having an anisotropy in refractive index and a dielectric anisotropy.

As examples of the optical shutter mechanisms, there are various types of mechanisms such as a dynamic scattering mode (DS), a phase transition mode, a twisted nematic mode (TN), a ferroelectric mode, a super twisted nematic mode (STN), a polymer dispersion mode and a homeotropic mode.

As examples of the systems for driving the display elements of the liquid crystal cell, there are various systems such as a segment driving system driving each cell independently, a simple matrix driving system driving each display element in a time-sharing condition, and an active matrix driving system providing a active element such as a transistor or a diode to each display element.

As the system for observing the LCD, there are a reflection system for providing a reflection layer with a ray reflection property on the back surface of the LCD and observing an image by reflecting rays entering from the front surface side at the reflection layer, and a transmission system for providing a light source on the back side of the LCD and observing an image by transmitting the rays radiated from the light source through the LCD. Further, there is a system combining the above both systems.

The liquid crystal display according to the present invention can be constituted by appropriately combining the above-described displaying systems (mechanisms), driving systems and observation systems. Among these combinations, a transmission type simple matrix driving super twisted nematic mode, transmission type active matrix driving twisted nematic mode, or reflection type simple matrix driving super twisted nematic mode liquid crystal display is preferred to obtain a great effect according to the present invention.

The problem that an angle of visibility is narrow can be solved without reducing a display quality of a liquid crystal display by providing the MLA described in the above to the observation surface side of a liquid crystal cell.

Generally, the change of an image quality of a liquid crystal cell due to the change of the observation direction occurs also by rotating the observation direction around a normal-line of the observation surface of the liquid crystal cell even if the angle defined between the observation direction and the normal-line direction is constant. Namely, the angle of visibility changes generally depending upon the moving direction of the observation direction from the front of the cell (from the normal-line direction of the observation surface of the liquid crystal cell), for example, depending upon upward moving, downward moving, lefthand moving or righthand moving. Further, as the case may be, for example, depending upon the purpose of the use of a liquid crystal display, there is a case required to enlarge the angle of visibility preferentially in a specified direction such as a right and left direction. In such a case, a liquid crystal display having a further high display quality can be obtained by designing the angles of visibility of the liquid crystal cell in a plurality of directions to have different values to each other, or by designing the functions of the lenses in a plurality of directions relative to the direction to be enlarged in angle of visibility to have different properties to each other.

For example, in a two-dimensional MLA as shown in FIGS. 3 to 5 or FIGS. 8 to 10, when attached to a liquid crystal cell, the angle of visibility can be enlarged in all of the upward, downward, righthand and lefthand directions. On the other hand, in a one-dimensional MLA as shown in FIGS. 1 and 2 or FIGS. 6 and 7, the angle of visibility can be enlarged only in the lens arrangement direction (the right and left direction of FIG. 1 or 6).

Further, the enlargement of the angle of visibility in all of the upward, downward, righthand and lefthand directions can be also achieved by stacking two or more one-dimensional microlens array sheets such that the lens arrangement directions thereof are set perpendicular to each other.

The size and position of the unit lens in the MLA according to the present invention can be designed depending on the size of the display element of the liquid crystal cell. In a case where the liquid crystal display is a dot matrix system, there are two desired embodiments with respect to the correspondence relationship between one display element and the unit lens. One is that a single unit lens precisely corresponds to a single display element of the liquid crystal cell, and the other is that two or more unit lenses correspond to a single display element. By the embodiments, the generation of a moire due to interference between the pitch of the lens arrangement of the MLA and the pitch of the display elements of the cell can be appropriately prevented. In these embodiments, the latter embodiment is preferred because a precise positional adjustment is not necessary, the same MLA can be used for cells having different dot sizes, and therefore the productivity can be increased. Further, preferably four or more unit lenses correspond to a single display element, and more preferably eight or more unit lenses correspond to a single display element.

Where, the number (n) of the unit lenses corresponding to a single display element is defined by the following equation (3) in a one-dimensional MLA, and by the following equation (4) in a two-dimensional MLA, respectively.

$$n = N/(L/l) \quad (3)$$

$$n = N/(A/a) \quad (4)$$

Where, N is the total number of unit lenses present on the display surface of the liquid crystal display, L is the length of the liquid crystal cell in the direction of unit lens arrangement direction of the one-dimensional MLA, "l" is the length of the portion contributing to the display in a single display element of the liquid crystal cell in the lens arrangement direction, A is the area of the display surface of the liquid crystal display, "a" is the area of the portion contributing to the display in a single display element of the liquid crystal cell. These equations indicate average number of the unit lenses corresponding to display element portions which are present in an area of the display surface of the liquid crystal display removing portions which do not directly contribute to the display such as a space for wiring.

In the present invention, the MLA is preferably attached to a liquid crystal cell as closely as possible so that the reduction of the display quality such as resolution and contrast can be suppressed. Concretely, the distance between the cell surface and the closest point of the MLA is preferably not more than 1.0 mm, more preferably not more than 0.5 mm, and further more preferably not more than 0.1 mm.

When the liquid crystal display according to the present invention is a transmission type liquid crystal display, preferably not less than 80% of the beams from the back light source is radiated within the range of effective angle of visibility of a liquid crystal cell incorporated thereinto.

Where, the range of effective angle of visibility of a liquid crystal cell means a range of an angle of visibility which can obtain a good image quality when the liquid crystal cell is observed, and in this case, it means a range of observation direction which can obtain 1/5 of the maximum contrast ratio in an observation direction realizing a best display quality.

There are two advantages obtained by using such a back light source having a directivity. One is that beams radiated from a light source such as a fluorescent lamp can be effectively utilized. Namely, since the liquid crystal display according to the present invention acts by the respective unit lenses of the microlens array sheet such that the beams transmitted in the directions indicating a bad image quality of the liquid crystal cell are refracted, thereby preventing them from giving a bad affection to the observation, as well as the beams transmitted in the directions indicating a good image can be observed from various directions, in a case of use of a back light source with no directivity which has been generally used, the beams radiated with a large angle relative to the normal-line direction of the display surface are not utilized. Accordingly, the beams radiated from a back light source can be effectively utilized by providing a directivity to the radiated beams from the light source.

The other advantage is that the blur of the displayed image can be prevented. Although the microlens array sheet is attached to the observation surface of the liquid crystal display desirably in a condition approaching to the liquid crystal cell as closely as possible in the present invention, because generally there provided a distance corresponding to a thickness of a base plate for charging a liquid crystal or a thickness of a polarization element between the display elements of the liquid crystal layer of the liquid crystal cell and the lens surface of the microlens array sheet, it is often difficult to approach the microlens array sheet to the liquid crystal cell sufficiently closely. Therefore, the beams having transmitted through one display element of the liquid crystal cell reach not only the unit lens portion corresponding to the display element but also unit lens portions positioned slightly apart away from the corresponding unit lens portion. As a result, the outline of a certain single display element of the liquid crystal cell is observed so that it becomes fuzzy and as if it is enlarged, by the operation of the unit lens portions around the corresponding unit lens portion, and therefore, the displayed image is blurred. However, when a back light source having a directivity is used, even if there is a slight distance between the display element portions of the liquid crystal layer and the lens surface of the microlens array sheet, because the beams having transmitted through the display element portions have a directivity, the beams reach mainly only the corresponding unit lens portions, and therefore, the displayed image does not blur. However, there is a case where a slight blur of the displayed image is preferred or required depending upon uses of the liquid crystal display. In such a case, it is possible to meet with the requirement by, for example, control of the directivity of the back light source.

With respect to the directivity of the back light source, preferably the following equation is satisfied to prevent the blur of the displayed image.

$$p \geq d \tan_\chi \qquad (5)$$

Where, "p" (mm) indicates a length of a display element of a liquid crystal cell in a lens arrangement direction, in other words, an arrangement pitch of the display elements. When the liquid crystal cell forms one dot with a plurality of pixels for a purpose such as color display, the one dot is defined as the display element. "d" (mm) indicates a distance from a liquid crystal layer to the unit lens arrangement plane of the second substance layer side of a microlens array sheet. "χ" indicates an angle defined between the direction indicating the maximum luminance and a direction in which half of the maximum luminance is indicated when the determination direction is inclined from the maximum luminance direction toward the unit lens arrangement direction in a point on the back light source (hereinafter, this angle is also called "a directional angle of a back light source").

To achieve such a back light source having a directivity, there are a method for using means for providing a directivity to the beam radiated from a light source such as a fluorescent tube such as a Fresnel lens or a Fresnel prism, a method for using a multi-reflector combining minute reflective surfaces as a reflection mirror, and a method for using means for absorbing unnecessary beams by an optical fiber sheet or louver, but it is not restricted by these methods. Among these methods, a method for providing a prism array sheet arranged with minute unit lenses or minute prisms in a form of a sheet to a luminous surface of a back light source near to a liquid crystal cell is preferred from the viewpoints of effectively utilizing the beams radiated from a light source such as a fluorescent tube and easily achieving a thin and light-weight structure.

As the methods for attaching the MLA to a liquid crystal cell, there are ones such as a method for attaching the MLA by using a MLA sheet prepared by providing the MLA on a plastic film, a method for forming the MLA directly on a liquid crystal display, and a method for using a polarization film attached to the MLA.

In a case using a MLA sheet, it is preferred that the MLA formation surface is set to the liquid crystal cell side in order to approach the MLA to the liquid crystal cell as closely as possible. A great effect for enlarging the angle of visibility can be obtained by such an attachment. Further, since the surface opposite to the MLA formation surface is an observation surface, a surface treatment such as a non-glare treatment or a surface hardening treatment which has been applied to a surface of a conventional liquid crystal display can be applied to the observation surface.

The method for fixing the MLA sheet to the liquid crystal cell may be either a method for stacking the MLA sheet onto the liquid crystal cell and fixing it at several points of the edge portions thereof or a method for bonding the MLA sheet to the liquid crystal cell by applying an adhesive on the surface of the display or over the entire surface of the MLA sheet. Further, the fixing can also be achieved by forming at least tip portions of the convex portions of the second or the first substance layer of the MLA sheet with a material having a sticky or adhesive property, and fixing the MLA sheet utilizing the sticky or adhesive property.

The liquid crystal display according to the present invention needs a liquid crystal cell and a microlens array sheet as inevitable elements, but the method for producing it is not particularly restricted. Namely, since the liquid crystal cell used in the present invention is one utilizing an electro-optical effect of liquid crystal molecules similarly to in a conventional liquid crystal display, the conventional method for producing the liquid crystal display can be employed as it is.

Figure 21:
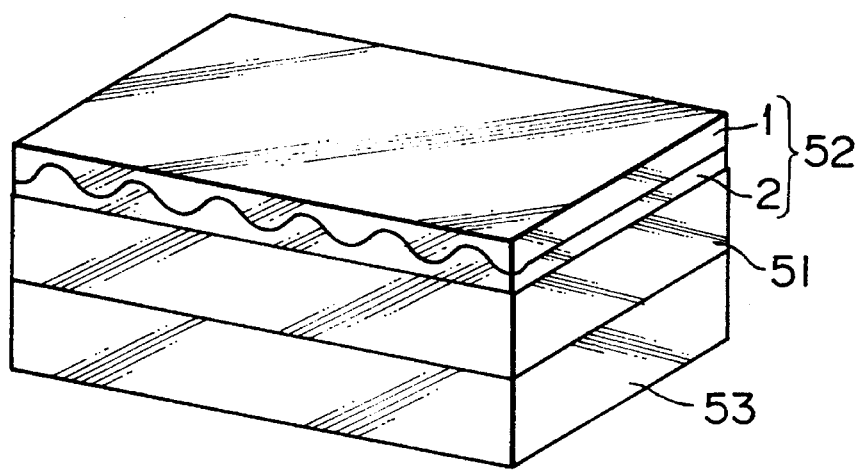
FIG. 21 is a schematic perspective view of a part of a liquid crystal display equipped with a microlens array sheet according to an embodiment of the present invention.

FIG. 21 shows an example of a structure of the liquid crystal display according to the present invention. A microlens array sheet 52 according to the present invention which composed of the first substance layer 1 and the second substance layer 2 having a refractive index less than that of the first substance layer 1 is attached to the observation surface of a liquid crystal cell 51 provided on a base plate 53 so that the first substance layer side becomes an observation side.

Hereinafter, the present invention will be explained referring to more concrete examples.

(1) Formation of microlens array sheet (No. 1)

Several molds each having a waving surface in a cavity were prepared. A ultraviolet curing resin (refractive index after curing: 1.46) was charged into the molds, a transparent polyester film (produced by Toray Industries, Inc., thickness: 100 μm) was stacked on each of the respective charged resins, and after the charged resins were cured by radiating a ultraviolet ray from a high pressure mercury lamp to precure the resins, the precured resins were removed from the molds. The ultraviolet ray was again radiated to removed resins from the lens formation surface sides thereof to cure the resins, and several one-dimensional MLAs were formed as shown in Table 1. The convex and concave surfaces of these MLAs were formed as one dimensional MLAs such as one shown in FIGS. 1 and 2 wherein barrel-like surfaces each having a part of a side surface of a column are arranged in one direction. The arrangement pitch thereof was 50 μm in any Example, but the heights of the convex were different from each other.

In a similar manner, microlens array sheets were prepared using a ultraviolet curing resin (refractive index after curing: 1.46) having a stickiness even after curing.

In this case, the ultraviolet curing resin layer is the first substance layer composed of a high-refractive index substance, and the air around the first substance layer is the second substance layer composed of a low-refractive index substance. Further, the plane which is the interface defined between the polyester film being formed as a base material and the ultraviolet curing resin layer, and the plane of the surface of the liquid crystal cell attached with the MLA (it is a hypothetical plane in an air in a state before attached to the liquid crystal cell), are the planar surfaces parallel to each other according to the present invention between which the first and second substance layers are positioned.

As the property of the minute unit lenses constituting these MLAs, the maximum refractive indexes thereof are also shown in Table 1. These microlens array sheets obtained are shown in Table 1 as Examples 1, 2, 4, 6 and Comparative Examples 1 and 3.

(2) Formation of microlens array sheet (No. 2)

A photomask having a stripe-like pattern (repeat of the width of ray cut-off portion of 45 μm and the width of ray transmitting portion of 5 μm) was prepared, and after applying a black paste having a ultraviolet curing property (a ultraviolet curing type acrylic resin added with carbon black and black color) onto a transparent polyester film treated for providing a good adhesive property (produced by Toray Industries, Inc., thickness: 100 μm) uniformly with a thickness of 30 μm, the photomask was brought into contact with the back surface of the applied surface and a ultraviolet ray was radiated from a high pressure mercury lamp.

Then, non-cured black paste was dissolved using a solvent to obtain a film on which ray cut-off means were formed. The shape of section of each ray cut-off means was nearly an isosceles triangle the width of the bottom of which contacting with the base film was 15 μm, the height of which was 20 μm, and in which the sides were depressed toward inside of the triangle.

A ultraviolet curing resin composition prepared by adding a ultraviolet absorbent to the ultraviolet curing resin used in the above (1) to provide a lens shape formation property was applied onto the surface formed with the ray cut-off means of the obtained film having the ray cut-off means, in a condition of a reference plane of the base film surface at a thickness of 60 μm.

Thereafter, a ultraviolet ray was radiated from the entire surface opposite to the surface applied with the ultraviolet curing resin, and the portions to be formed as the first substance layer were selectively cured utilizing the ultraviolet absorbing property of the ray cut-off means. At that time, changing the intensity of the radiation of the ultraviolet ray, microlens array sheets having different lens heights were made.

Figure 15:
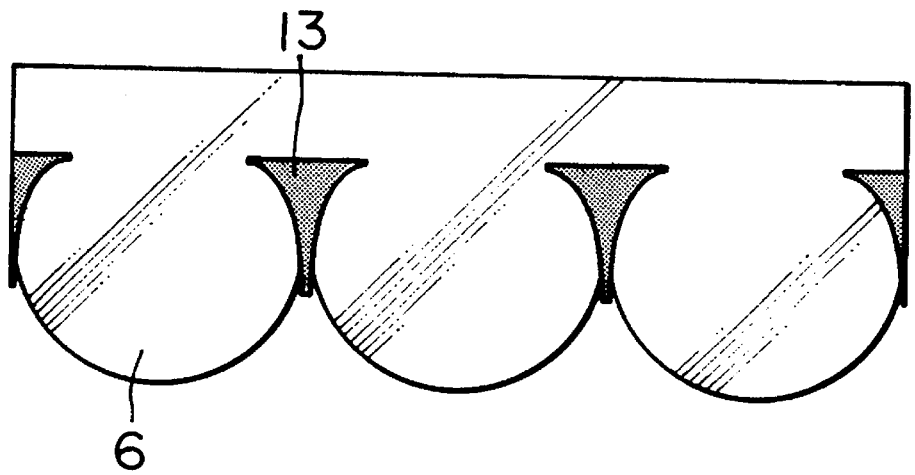
FIG. 15 is a vertical sectional view of a part of a microlens array sheet according to another example of the second embodiment of the present invention.
Figure 16:
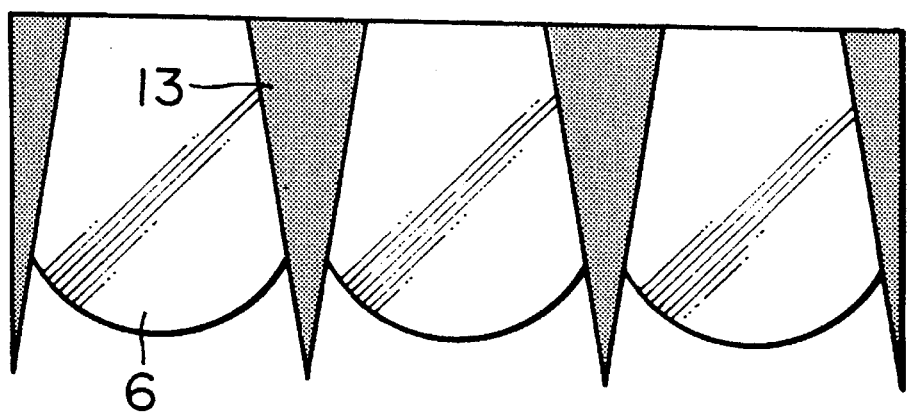
FIG. 16 is a vertical sectional view of a part of a microlens array sheet according to a further example of the second embodiment of the present invention.
Figure 17:
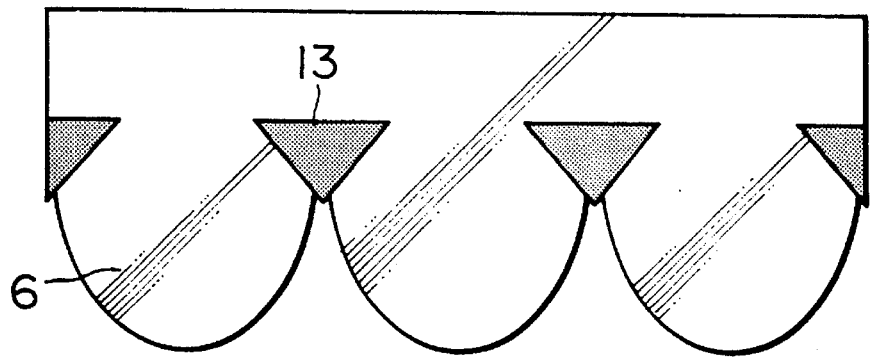
FIG. 17 is a vertical sectional view of a part of a microlens array sheet according to a still further example of the second embodiment of the present invention.

Non-cured portions were removed by dissolving them with an organic solvent from the obtained sheets, and the microlens array sheets each having a section shape shown in FIG. 15 according to the second embodiment of the present invention were obtained. As the property of the minute unit lenses constituting these MLAs, the maximum refractive indexes thereof are also shown in Table 1. These microlens array sheets obtained are shown in Table 1 as Examples 3, 5, 7 and 8.

(3) Formation and estimation of liquid crystal display

Microlens array sheets prepared in the above (1) and (2) were used, and when the minute unit lenses were formed from a sticky resin, the sheet was attached to the surface of observation side of a liquid crystal cell utilizing the stickiness thereof, and when formed from non-sticky resin, the sheet was stacked on a liquid crystal cell and it was fixed by pressing it by a hard acrylic plate provided thereon and having a thickness of 2.0 mm. Thus, the liquid crystal displays according to the present invention and the comparative liquid crystal displays were obtained. At the same time, as a comparative example, a liquid crystal cell with no microlens array sheet, that is, a conventional liquid crystal display was prepared.

In these liquid crystal displays, the arrangement direction of unit lenses of a microlens array sheet was set to an up and down direction of a display surface in any case. Further, except Comparative Example 3, the microlens array sheet was attached in a condition of directing the second substance layer side, i.e., the air layer side to the liquid crystal cell side. In Comparative Example 3, although the used microlens array sheet was the same as that of Example 1, changing the direction of the attachment, the microlens array sheet was attached in a condition of directing the first substance layer side, i.e., the polyester film base plate side to the liquid crystal cell side.

As the liquid crystal cell used, two types of liquid crystal cell were prepared (Examples 1, 2, 3, 4, 5, 6 and 7 and Comparative Examples 1, 2 and 3). One was a simple matrix monochro liquid crystal cell using a super twisted nematic mode. (Hereinafter, it is also called "STN cell". It is mounted on a personal computer on the market, the size of the display surface is about 8.9 inch in diagonal, the number of the display elements is 400 in the vertical direction and 640 in the horizontal direction, the dot pitch is 290 μm and it is equipped with a back light.) The other was a TFT active matrix color liquid crystal cell using a twisted nematic mode. (Hereinafter, it is also called "TFT cell". It is also mounted on a personal computer on the market, the size of the display surface is about 9.5 inch in diagonal, the number of the display elements is 480 in the vertical direction and 640 in the horizontal direction, the dot pitch is 290 μm and it is equipped with a back light.)

Further, a back light having a directivity of 15 degrees in directional angle thereof to the surface of which a prism array sheet was attached was prepared. This back light was substituted for the back light having no directivity which has been attached to the STN cell or the TFT cell to prepare another type of liquid crystal display (Example 8).

The results of estimation of the properties of the liquid crystal displays thus obtained which were determined as follows are shown in Table 2.

(4) Method for estimating the properties

① Angle of visibility

In the case of the STN cell, an image constructed from two gradations of black and white, and in the case of the TFT cell, an image constructed from three gradations including gray indicating an exact intermediate transmittance (50%) between black and white in addition to black and white, were displayed, respectively, and in a condition where the image was observed from the upper side and the lower side relative to a zero degree direction of the normal-line direction of the display surface, the change in the observation was determined. The observation was performed in a dark room, and when the observation direction was gradually inclined from the normal-line direction at a pitch of five degrees, the determination of the angle was continued until an angle at which the displayed image was not recognized or an angle at which the gradations were turned over.

② Front contrast ratio

The ratio of the luminance of the portion displaying white to the luminance of the portion displaying black when observed from the front (from the normal-line direction of the display surface) was defined as front contrast ratio.

However, since the contrast ratio sometimes greatly changes even at a slight change of angle depending upon the structure of the liquid crystal cell, the average value of the contrast ratios determined at five points of −10 degrees, −5 degrees, 0 degree, +5 degrees and +10 degrees in observation direction was defined as the front contrast ratio.

③ Use in an environment in which outer rays are present (Use under outer rays)

Each liquid crystal display was observed in an indoor environment in which ordinary room lights were present and in an outdoor environment of a fine weather. The estimation was determined by three grades. The state where there was no particular change in the displayed image was determined to be a grade "o", the state where the displayed content could be read although reflection of outer rays was present was determined to be a grade "Δ", and the state where the displayed content could not be read was determined to be a grade "X".

From the results shown in Table 2, it is understood that a liquid crystal display having a sufficiently large angle of visibility, i.e., an angle of visibility of not less than ±45 degrees in upward and downward directions can be obtained in any of the STN cell and the TFT cell by the microlens array sheet according to the first embodiment of the present invention.

Further, it is understood that a liquid crystal display of which reduction of visibility due to outer rays is suppressed even under an environment with outer rays can be obtained by the microlens array sheet according to the second and third embodiments of the present invention.

Further, it is understood that a liquid crystal display having the properties of these embodiments together can be obtained by appropriately combining these embodiments.

In these liquid crystal displays according to the present invention, the maximum contrast ratios thereof are maintained at a value not less than a value required for displaying a photographic image, for example, not less than 40 in TFT cell.

Furthermore, it is understood that a liquid crystal display having a large angle of visibility, of which reduction of image quality observed from the front is also suppressed and of which deterioration of image quality can be prevented actually even in a large-capacity and high-definition display such as one used in the Examples, can be obtained by using the back light having a directivity.

TABLE 1

| | Property of microlens array sheet | | | | |
|---|---|---|---|---|---|
| | Lens property | | | | |
| | Lens height ($\mu$m) | Maximum refractive angle $\alpha$ (degree) | Shape of ray cut-off means | Stickiness of lens resin | Note |
| Example 1 | 17 | 45 | — | — | Example according to the first embodiment |
| Example 2 | 14 | 35 | — | — | Example according to the first embodiment |
| Example 3 | 11 | 25 | triangular section | — | Example according to the second embodiment |
| Example 4 | 11 | 25 | — | present | Example according to the third embodiment |
| Example 5 | 14 | 35 | triangular section | — | Example according the first and second embodiments |
| Example 6 | 14 | 35 | — | present | Example combining the first and third embodiments |
| Example 7 | 14 | 35 | triangular section | present | Example combining the first, second and third embodiments |
| Example 8 | 14 | 35 | triangular section | present | Example using a back light source with a directivity |
| Comparative Example 1 | 11 | 25 | — | — | Comparative Example |
| Comparative Example 2 | — | — | — | — | Comparative Example with no MLA |
| Comparative Example 3 | 17 | 45 | — | — | Comparative Example with respect to direction of MLA attachment |

TABLE 2

| | Result of estimation | | | | | |
|---|---|---|---|---|---|---|
| | STN cell | TFT cell | | | | |
| | Angle of visibility (upward/downward) (degree) | Angle of visibility (upward/downward) (degree) | Front contrast ratio | Use under outer rays | | |
| | | | | Indoor | Outdoor | Note |
| Example 1 | not more than +45/−80 | not more than +45/−50 | 40 | x | x | Example according to the first embodiment |
| Example 2 | not more than +45/−80 | not more than +45/−45 | 42 | x | x | Example according to the first embodiment |
| Example 3 | not more than +40/−80 | not more than +35/−40 | 48 | o | o | Example according to the second embodiment |
| Example 4 | not more than +40/−80 | not more than +35/−40 | 51 | o | o | Example according to the third embodiment |
| Example 5 | not more than +45/−80 | not more than +45/−50 | 43 | o | o | Example combining the first and second embodiments |
| Example 6 | not more than +45/−80 | not more than +45/−50 | 40 | o | o | Example combining the first and third embodiments |
| Example 7 | not more than +45/−80 | not more than +45/−50 | 49 | o | o | Example combining the first, second and third embodiments |
| Example 8 | not more than +45/−45 | not more than +45/−45 | 68 | o | o | Example using a back light source with a directivity |
| Comparative Example 1 | not more than +40/−80 | not more than +35/−40 | 48 | Δ | x | Comparative Example |
| Comparative Example 2 | not more than +30/−60 | not more than +15/−25 | 71 | o | o | Comparative Example with no MLA |
| Comparative Example 3 | not more than +35/−80 | not more than +30/−35 | 27 | Δ | x | Comparative Example with respect to direction of MLA attachment |

Although preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A microlens array sheet for a liquid crystal display, said microlens array sheet comprising a first substance layer having a first refractive index and a second substance layer having a refractive index less than said first refractive index, said first and second substance layers having an interface between them and being positioned between two planar surfaces parallel to each other, a plurality of minute unit lenses being formed from said interface and said first and second substance layers by providing concave and/or convex surfaces to said interface, said plurality of minute unit lenses being arranged in a plane along said two planar surfaces, and when an acute angle defined by intersection of a tangent plane of a point present on said interface having said concave and/or convex surfaces and one of said planar surfaces is referred to as "θ" and a point present on said interface making said "θ" a maximum value "θ max" is referred to as a point A, a refractive angle, indicated when a ray having reached said point A after entering into said microlens array sheet from a normal-line direction of a surface present on said second substance layer side exits into an atmosphere from a surface present on said first substance layer side after transmitting through said first substance layer, is not less than 30 degrees in an angle relative to a normal line of said surface present on said first substance layer side.

2. The microlens array sheet according to claim 1 further comprising ray cut-off means capable of cutting off some rays which have reached said plane arranged with said minute unit lenses before said rays enter said plane, said cut-off means also being capable of cutting off rays that enter said plane from a normal-line direction and repeat a total reflection based on a difference between said refractive indexes of said first and second substance layers at least two times, said cut-off means being positioned on at least one of a ray entrance portion and a ray exit portion of the plane.

3. The microlens array sheet according to claim 1, wherein said minute unit lenses are convex lenses, said microlens array sheet further comprises ray cut-off means for cutting a ray off, said ray cut-off means having a property absorbing a visible ray and formed as a sectional shape which becomes narrower in width thereof as it extends from the bottom side of said minute unit lenses toward the convex side of said minute unit lenses, and convex surfaces of said convex lenses formed on said first substance layer are located between said ray cut-off means and an adjacent ray cut-off means or at a position projecting from the tip of said ray cut-off means.

4. The microlens array sheet according to claim 1, wherein at least tip portions of convex portions of said first substance layer in said minute unit lenses are formed from a sticky or adhesive resin.

5. The microlens array sheet according to claim 1, wherein said plurality of minute unit lenses comprise at least 100 unit lenses.

6. A microlens array sheet for a liquid crystal display, said microlens array sheet comprising a first substance layer having a first refractive index, a second substance layer having a refractive index less than said first refractive index, and ray cut-off means, said first and second substance layers having an interface between them and being positioned between two planar surfaces parallel to each other, a plurality of minute unit lenses being formed from said interface and said first and second substance layers by providing concave and/or convex surfaces to said interface, said plurality of minute unit lenses being arranged in a plane along said two planar surfaces, and said ray cut-off means being capable of cutting off some rays which have reached said plane before said rays enter said plane, said cut-off means also being capable of cutting off rays which enter said plane from a normal-line direction and repeat a total reflection based on a difference between said refractive indexes of said first and second substance layers at least two times, said ray cut-off means being positioned on at least one of a ray entrance portion and a ray exit portion of said plane.

7. A microlens array sheet for a liquid crystal display, said microlens array sheet comprising a first substance layer having a first refractive index, a second substance layer having a refractive index less than said first refractive index, and ray cut-off means, said first and second substance layers having an interface between them and being positioned between two planar surfaces parallel to each other, a plurality of minute unit convex lenses being formed from said interface and said first and second substance layers by providing convex surfaces to said interface, said plurality of minute unit lenses being arranged in a plane along said two planar surfaces, and said ray cut-off means being capable of cutting off some rays which have reached said plane before said rays enter said plane, said ray cut-off means also being capable of cutting off rays which enter said plane from a normal-line direction and repeat a total reflection based on a difference between said refractive indexes of said first and second substance layers at least two times, said cut-off means being positioned on at least one of a ray entrance portion and a ray exit portion of said plane, said ray cut-off means further being capable of absorbing a visible ray, said ray cut-off means having a tip and being formed as a sectional shape which becomes narrower in width thereof as it extends from the bottom side of said minute unit lenses toward the convex side of said minute unit lenses, and said convex surfaces of said convex lenses formed on said first substance layer are located between said ray cut-off means and an adjacent ray cut-off means or at a position projecting from said tip of said ray cut-off means.

8. A microlens array sheet for a liquid crystal display, said microlens array sheet comprising a first substance layer having a first refractive index, a second substance layer having a refractive index less than said first refractive index, and ray cut-off means, said first and second substance layers having an interface between them and being positioned between two planar surfaces parallel to each other, a plurality of minute unit lenses being formed from said interface and said first and second substance layers by providing concave and/or convex surfaces to said interface, said first substance layer having convex portions including tip portions, with at least said tip portions of said convex portions being formed from a sticky or adhesive resin, said plurality of minute unit lenses being arranged in a plane along said two planar surfaces, and said ray cut-off means being capable of cutting off some rays which have reached said plane before said rays enter said plane, said ray cut-off means also being capable of cutting off rays which enter said plane from a normal-line direction and repeat a total reflection based on a difference between said refractive indexes of said first and second substance layers at least two times, said cut-off means being positioned on at least one of a ray entrance portion and a ray exit portion of said plane.

9. A microlens array sheet for a liquid crystal display, said microlens array sheet comprising a first substance layer having a first refractive index, a second substance layer having a refractive index less than said first refractive index, and ray cut-off means, said first and second substance layers having an interface between them and being positioned between two planar surfaces parallel to each other, a plurality of minute unit lenses being formed from said interface and said first and second substance layers by providing convex surfaces which define convex lenses having a bottom side and a convex side to said interface, said plurality of minute unit lenses being arranged in a plane along said two planar surfaces, said ray cut-off means is absorptive of visible rays and is formed as a sectional shape which becomes narrower in width thereof as it extends from the bottom side of said minute unit lenses toward the convex side of said minute unit lenses, and convex surfaces of said convex lenses formed on said first substance layer are located between said ray cut-off means and an adjacent ray cut-off means or at a position projecting from the tip of said ray cut-off means.

10. The microlens array sheet according to claim 9, wherein at least tip portions of convex portions of said first substance layer in said minute unit lenses are formed from a sticky or adhesive resin.

11. A microlens array sheet for a liquid crystal display, said microlens array sheet comprising a first substance layer having a first refractive index and a second substance layer having a refractive index less than said first refractive index, said first and second substance layers having an interface between them and being positioned between two planar surfaces parallel to each other, a plurality of minute unit lenses being formed from said interface and said first and second substance layers, at least a portion of said minute unit lenses having convex surfaces to said interface on said first substance layer, said plurality of minute unit lenses being arranged in a plane along said two planar surfaces, and at least tip portions of said convex surfaces of said first substance layer in said minute unit lenses being formed from a sticky or adhesive resin.

12. A method for attaching a microlens array sheet for a liquid crystal display, said microlens array sheet comprising a first substance layer having a first refractive index and a second substance layer having a refractive index less than said first refractive index, said first and second substance layers having an interface between them and being positioned between two planar surfaces that are parallel to each other, a plurality of minute unit lenses being formed from said interface and said first and second substance layers, at least a portion of said minute unit lenses having convex surfaces to said interface on said first substance layer, said plurality of minute until lenses being arranged in a plane along said two planar surfaces, the method comprising bringing tip portions of convex portions of said first substance layer in said minute unit lenses into contact with a surface of a liquid crystal cell.

13. The method according to claim 12, wherein, in said microlens array sheet, when an acute angle defined by intersection of a tangent plane of a point present on said interface having said concave and/or convex surfaces and one of said planar surfaces is referred to as "θ" and a point present on said interface making said "θ" a maximum value "θ max" is referred to as a point A, a refractive angle, indicated when a ray having reached said point A after entering into said microlens array sheet from a normal-line direction of a surface present on said second substance layer side exits into an atmosphere from a surface present on said first substance layer side after transmitting through said first substance layer, is not less than 30 degrees in an angle relative to a normal line of said surface present on said first substance layer side.

14. The method according to claim 12, wherein said microlens array sheet further comprises ray cut-off means, said ray cut-off means being capable of cutting off some rays which have reached said plane before said rays enter said plane, said cut-off means also being capable of cutting off rays that enter said plane from a normal-line direction and exit from said plane after repeating a total reflection based on a difference between said refractive indexes of said first and second substance layers at least two times, said cut-off means being positioned on at least one of a ray entrance portion and a ray exit portion of said plane.

15. The method according to claim 12, wherein said microlens array sheet further comprises ray cut-off means, said minute unit lenses are convex lenses, said ray cut-off means has a property absorbing a visible ray and is formed as a sectional shape which becomes narrower in width thereof as it extends from the bottom side of said minute unit lenses toward the convex side of said minute unit lenses, and convex surfaces of said convex lenses formed on said first substance layer are located between said ray cut-off means and an adjacent ray cut-off means or at a position projecting from the tip of said ray cut-off means.

16. A liquid crystal display comprising a microlens array sheet which comprises a first substance layer having a first refractive index and a second substance layer having a refractive index less than said first refractive index, said first and second substance layers having an interface between them and being positioned between two planar surfaces parallel to each other, a plurality of minute unit lenses being formed from said interface and said first and second substance layers by providing concave and/or convex surfaces to said interface, said plurality of minute unit lenses being arranged in a plane along said two planar surfaces, and when an acute angle defined by intersection of a tangent plane of a point present on said interface having said concave and/or convex surfaces and one of said planar surfaces is referred to as "θ" and a point present on said interface making said "θ" a maximum value "θ max" is referred to as a point A, a refractive angle, indicated when a ray having reached said point A after entering into said microlens array sheet from a normal-line direction of a surface present on said second substance layer side exits into an atmosphere from a surface present on said first substance layer side after transmitting through said first substance layer, is not less than 30 degrees in an angle relative to a normal line of said surface present on said first substance layer side, and said microlens array sheet is attached to an observation surface of a liquid crystal cell in a manner that said first substance layer is directed to a side of observation and said second substance layer is directed to a side of said liquid crystal cell.

17. The liquid crystal display according to claim 16, wherein said liquid crystal display is a transmission type liquid crystal display having a back light source, and not less than 80% of the beam of said back light source is radiated within an effective visible area of said liquid crystal cell.

18. A liquid crystal display comprising a microlens array sheet which comprises a first substance layer having a first refractive index, a second substance layer having a refractive index less than said first refractive index, and ray cut-off means, said first and second substance layers having an interface between them and being positioned between two planar surfaces parallel to each other, a plurality of minute unit lenses being formed from said interface and said first and second substance layers by providing concave and/or convex surfaces to said interface, said plurality of minute unit lenses being arranged in a plane along said two planar surfaces, and said ray cut-off means being capable of cutting off some rays which have reached said plane before said rays enter said plane, said cut-off means also being capable of cutting off rays that enter said plane from a normal-line direction and exit from said plane after repeating a total reflection based on a difference between said refractive indexes of said first and second substance layers at least two times, said cut-off means being positioned on at least one of a ray entrance portion and a ray exit portion of said plane, and said microlens array sheet is attached to an observation surface of a liquid crystal cell in a manner that said first substance layer is directed to a side of observation and said second substance layer is directed to a side of said liquid crystal cell.

19. The liquid crystal display according to claim 18, wherein said liquid crystal display is a transmission type liquid crystal display having a back light source, and not less than 80% of the beam of said back light source is radiated within an effective visible area of said liquid crystal cell.

20. A liquid crystal display comprising a microlens array sheet which comprises a first substance layer having a first refractive index, a second substance layer having a refractive index less than said first refractive index, and ray cut-off means, said first and second substance layers having an interface between them and being positioned between two planar surfaces parallel to each other, a plurality of minute unit lenses being formed from said interface and said first and second substance layers by providing convex surfaces to said interface which define convex lenses having a bottom side and a convex side, said plurality of minute unit lenses being arranged in a plane along said two planar surfaces, said ray cut-off means is absorptive of visible rays and is formed as a sectional shape which becomes narrower in width thereof as it extends from the bottom side of said minute unit lenses toward the convex side of said minute unit lenses thereby forming at a tip, and convex surfaces of said convex lenses formed on said first substance layer are located between said ray cut-off means and an adjacent ray cut-off means or at a position projecting from the tip of said ray cut-off means, and said microlens array sheet is attached is an observation surface of a liquid crystal cell in a manner that said first substance layer is directed to a side of observation and said second substance layer is directed to a side of said liquid crystal cell.

21. The liquid crystal display according to claim 20, wherein said liquid crystal display is a transmission type liquid crystal display having a back light source, and not less than 80% of the beam of said back light source is radiated within an effective visible area of said liquid crystal cell.

22. A liquid crystal display comprising a microlens array sheet which comprises a first substance layer having a first refractive index and a second substance layer having a refractive index less than said first refractive index, said first and second substance layers having an interface between them and being positioned between two planar surfaces parallel to each other, a plurality of minute unit lenses being formed from said interface and said first and second substance layers, at least a portion of said minute unit lenses having convex surfaces to said interface on said first substance layer, said plurality of minute unit lenses being arranged in a plane along said two planar surfaces, and at least tip portions of convex surfaces of said first substance layer in said minute unit lenses being formed from a sticky or adhesive resin and said microlens array sheet is attached to an observation surface of a liquid crystal cell in a manner that said first substance layer is directed to a side of observation and said second substance layer is directed to a side of said liquid crystal cell.

23. The liquid crystal display according to claim 22, wherein said liquid crystal display is a transmission type liquid crystal display having a back light source, and not less than 80% of the beam of said back light source is radiated within an effective visible area of said liquid crystal cell.

* * * * *